(12) United States Patent
Cain, III et al.

(10) Patent No.: US 9,696,927 B2
(45) Date of Patent: Jul. 4, 2017

(54) MEMORY TRANSACTION HAVING IMPLICIT ORDERING EFFECTS

(71) Applicant: INTERNATIONAL BUSINESS MACHINES CORPORATION, Armonk, NY (US)

(72) Inventors: Harold Wade Cain, III, Raleigh, NC (US); Kattamuri Ekanadham, Mohegan Lake, NY (US); Maged M. Michael, Danbury, CT (US); Pratap C. Pattnaik, Ossining, NY (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 14/309,443

(22) Filed: Jun. 19, 2014

(65) Prior Publication Data

US 2015/0370613 A1   Dec. 24, 2015

(51) Int. Cl.
*G06F 9/52* (2006.01)
*G06F 3/06* (2006.01)
(Continued)

(52) U.S. Cl.
CPC ......... *G06F 3/0622* (2013.01); *G06F 3/0659* (2013.01); *G06F 3/0683* (2013.01);
(Continued)

(58) Field of Classification Search
CPC ............ G06F 9/466–9/467; G06F 9/52–9/528
See application file for complete search history.

(56) References Cited

U.S. PATENT DOCUMENTS

2008/0016249 A1 * 1/2008 Ellis ..................... G06F 9/52
                                                                709/248
2009/0319739 A1 * 12/2009 Shpeisman et al. .......... 711/163
(Continued)

OTHER PUBLICATIONS

Cain et al. "Robust architectural support for transactional memory in the power architecture." ACM SIGARCH Computer Architecture News 41.3 (2013): pp. 225-236.*
(Continued)

*Primary Examiner* — Nicholas Simonetti
(74) *Attorney, Agent, or Firm* — Brian F. Russell; Steven L. Bennett

(57) ABSTRACT

In at least some embodiments, a processor core executes a code segment including a memory transaction and a non-transactional memory access instructions preceding the memory transaction in program order. The memory transaction includes at least an initiating instruction, a transactional memory access instruction, and a terminating instruction. The initiating instruction has an implicit barrier that imparts the effect of ordering execution of the transactional memory access instruction within the memory transaction with respect to the non-transactional memory access instructions preceding the memory transaction in program order. Executing the code segment includes executing the transactional memory access instruction within the memory transaction concurrently with at least one of the non-transactional memory access instructions preceding the memory transaction in program order and enforcing the barrier implicit in the initiating instruction following execution of the initiating instruction.

12 Claims, 12 Drawing Sheets

(51) Int. Cl.
*G06F 13/16* (2006.01)
*G06F 9/46* (2006.01)
(52) U.S. Cl.
CPC .............. *G06F 9/467* (2013.01); *G06F 9/522* (2013.01); *G06F 9/528* (2013.01); *G06F 13/1663* (2013.01)

(56) References Cited

U.S. PATENT DOCUMENTS

2010/0153953 A1* 6/2010 Adl-Tabatabai ........ G06F 9/528
718/101
2014/0013060 A1* 1/2014 Frey et al. .................... 711/146

OTHER PUBLICATIONS

Harlod Cain et al., U.S. Appl. No. 14/487,744, filed Sep. 16, 2014, Non-Final Office Action dated Jan. 21, 2016.
Harlod Cain et al., U.S. Appl. No. 14/487,744, filed Sep. 16, 2014, Non-Final Office Action dated Jul. 22, 2016.
Harlod Cain et al., U.S. Appl. No. 14/487,744, filed Sep. 16, 2014, Final Office Action dated Nov. 18, 2016.
Harlod Cain et al., U.S. Appl. No. 14/487,744, filed Sep. 16, 2014, Notice of Allowance dated Feb. 28, 2017.

* cited by examiner

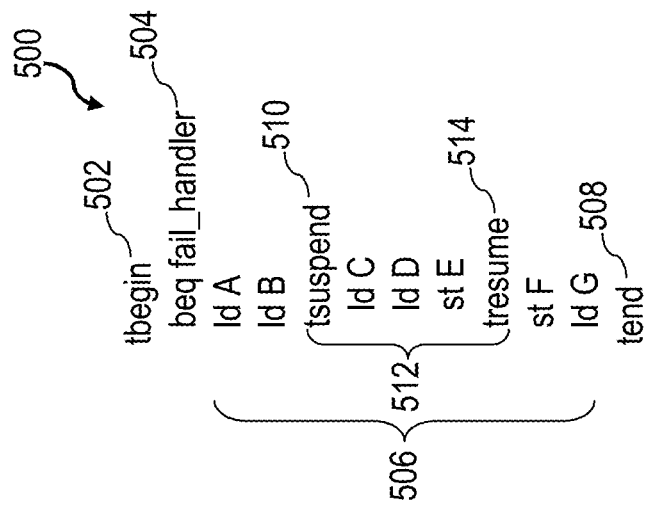
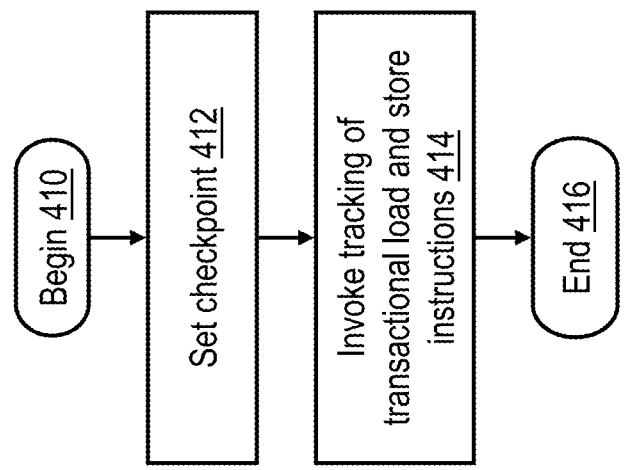
*Figure 5*
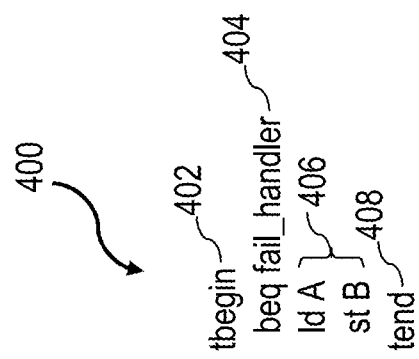
*Figure 4A*

| Processor Core 0 | Processor Core 1 | Processor Core 2 |
|---|---|---|
| st A, 1  ~600 | ld A  ~610<br>SYNC  ~612<br>st B, 1  ~614 | ld B  ~620<br>SYNC  ~622<br>ld A  ~624 |

*Figure 6A*

| Processor Core 0 | Processor Core 1 | Processor Core 2 |
|---|---|---|
| tbegin  ~632<br>st A, 1  ~634  } ~630<br>tend  ~636 | tbegin<br>ld A  ~642<br>st B, 1  } ~640<br>tend | tbegin<br>ld B  ~652  } ~650<br>ld A  ~654<br>tend |

*Figure 6B*

| Processor Core 0 | Processor Core 1 | Processor Core 2 |
|---|---|---|
| st A, 1  ~660 | tbegin  ~672<br>ld A  ~674  } ~670<br>st B, 1<br>tend  ~676 | ld B  ~680<br>SYNC  ~682<br>ld A  ~684 |

*Figure 6C*

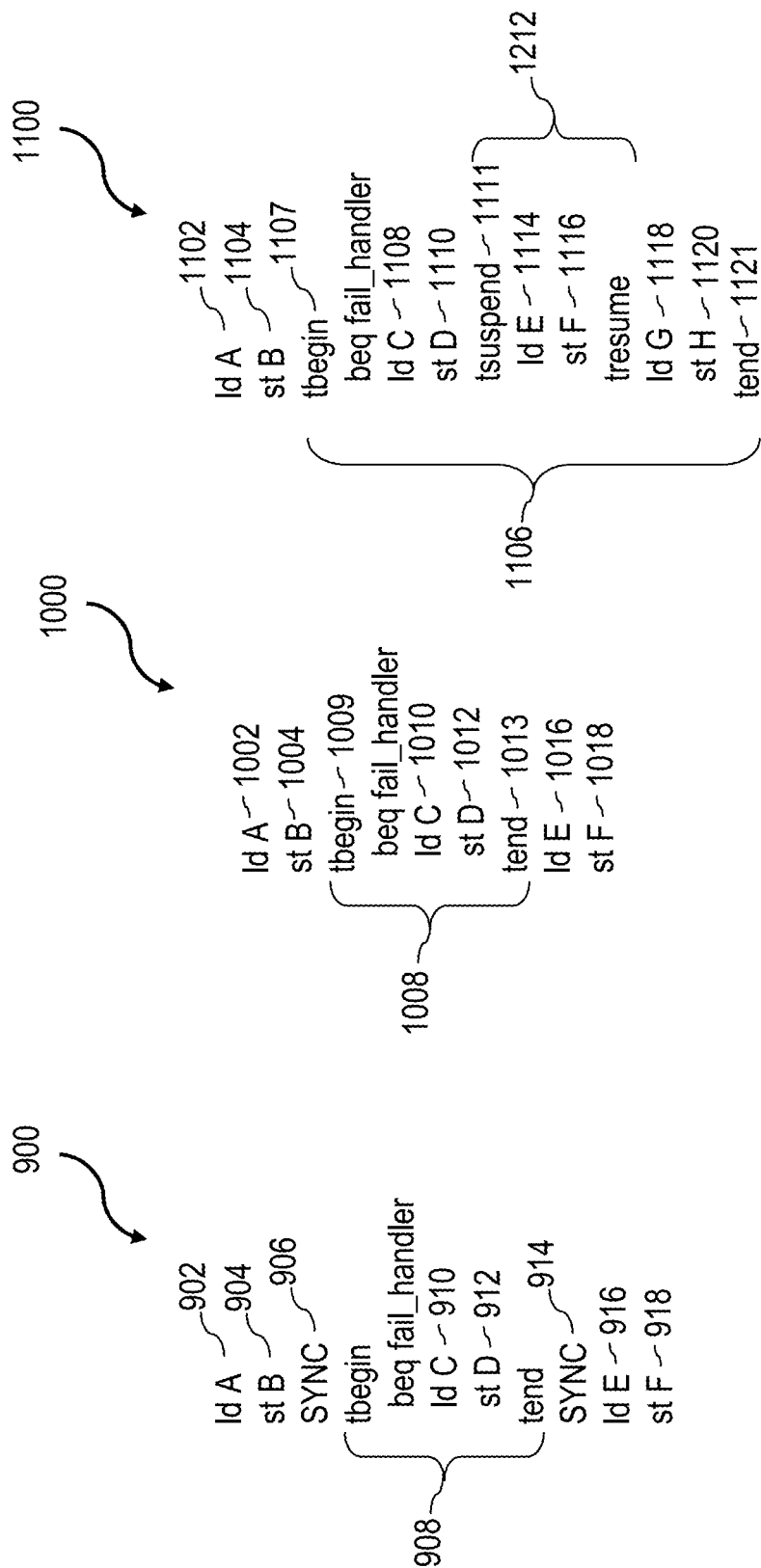

MEMORY TRANSACTION HAVING IMPLICIT ORDERING EFFECTS

CROSS-REFERENCE

The present application is related to Ser. Nos. 13/657,012 and 14/192,179, which are incorporated herein by reference in their entireties.

BACKGROUND OF THE INVENTION

The present invention relates generally to data processing and, in particular, to storage accesses to the distributed shared memory system of a data processing system.

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then accesses lower-level caches (e.g., level two (L2) or level three (L3) caches) or system memory for the requested memory block. The lowest level cache (e.g., L3 cache) is often shared among several processor cores.

In such systems, multiprocessor software concurrently accesses shared data structures from multiple software threads. When concurrently accessing shared data it is typically necessary to prevent so-called "unconstrained races" or "conflicts". A conflict occurs between two memory accesses when they are to the same memory location and at least one of them is a write and there is no means to ensure the ordering in which those accesses occur.

Multiprocessor software typically utilizes lock variables to coordinate the concurrent reading and modifying of locations in memory in an orderly conflict-free fashion. A lock variable is a location in memory that is read and then set to a certain value, possibly based on the value read, in an atomic fashion. The read-modify-write operation on a lock variable is often accomplished utilizing an atomic-read-modify-write (ARMW) instruction or by a sequence of instructions that provide the same effect as a single instruction that atomically reads and modifies the lock variable.

In this manner, a software thread reading an initial "unlocked" value via an ARMW instruction is said to have "acquired" the lock and will, until it releases the lock, be the only software thread that holds the lock. The thread holding the lock may safely update the shared memory locations protected by the lock without conflict with other threads because the other threads cannot obtain the lock until the current thread releases the lock. When the shared locations have been read and/or modified appropriately, the thread holding the lock releases the lock (e.g., by writing the lock variable to the "unlocked" value) to allow other threads to access the shared locations in storage.

While locking coordinates competing threads' accesses to shared data, locking suffers from a number of well known shortcomings. These include, among others, (1) the possibility of deadlock when a given thread holds more than one lock and prevents the forward progress of other threads and (2) the performance cost of lock acquisition when the lock may not have been strictly necessary because no conflicting accesses would have occurred to the shared data.

To overcome these limitations, the notion of transactional memory can be employed. In transactional memory, a set of load and/or store instructions are treated as a "transaction." A transaction succeeds when the constituent load and store operations can occur atomically without a conflict with another thread. The transaction fails in the presence of a conflict with another thread and can then be re-attempted. If a transaction continues to fail, software may fall back to using locking to ensure the orderly access of shared data.

To support transactional memory, the underlying hardware tracks the storage locations involved in the transaction—the transaction footprint—as the transaction executes for conflicts. If a conflict occurs in the transaction footprint, the transaction is aborted and possibly restarted. Use of transactional memory reduces the possibility of deadlock due to a thread holding multiple locks because, in the typical case, no locks are held (the transaction simply attempts to make one or more storage accesses and restarts if a conflict occurs). Further, the processing overhead of acquiring a lock is generally avoided.

BRIEF SUMMARY

In at least some embodiments, a processor core executes a code segment including a memory transaction and a non-transactional memory access instructions preceding the memory transaction in program order. The memory transaction includes at least an initiating instruction, a transactional memory access instruction, and a terminating instruction. The initiating instruction has an implicit barrier that imparts the effect of ordering execution of the transactional memory access instruction within the memory transaction with respect to the non-transactional memory access instructions preceding the memory transaction in program order. Executing the code segment includes executing the transactional memory access instruction within the memory transaction concurrently with at least one of the non-transactional memory access instructions preceding the memory transaction in program order and enforcing the barrier implicit in the initiating instruction following execution of the initiating instruction.

BRIEF DESCRIPTION OF THE SEVERAL VIEWS OF THE DRAWINGS

FIG. 4A is an illustrative example of a memory transaction in accordance with one embodiment;

FIG. 4B is a high level logical flowchart of an exemplary method of executing an instruction that initiates a memory transaction in accordance with one embodiment;

FIG. 5 is an illustrative example of a memory transaction including a suspended region in accordance with one embodiment;

FIG. 6A depicts execution of an exemplary program illustrating causality in a multiprocessor data processing system;

FIG. 6B illustrates execution of an exemplary program including memory transactions to ensure causality;

FIG. 6C depicts execution of an exemplary program including both transactional and non-transactional memory accesses;

FIG. 9 is an example of a code segment including a memory transaction having explicit barrier instructions preceding and following the memory transaction in accordance with the prior art;

FIG. 10 is an illustrative example of a code segment including a memory transaction preceded and followed by non-transactional memory access instructions in accordance with one embodiment;

FIG. 11 is an illustrative example of a code segment including a memory transaction having a suspended region in accordance with one embodiment;

DETAILED DESCRIPTION

Figure 1:
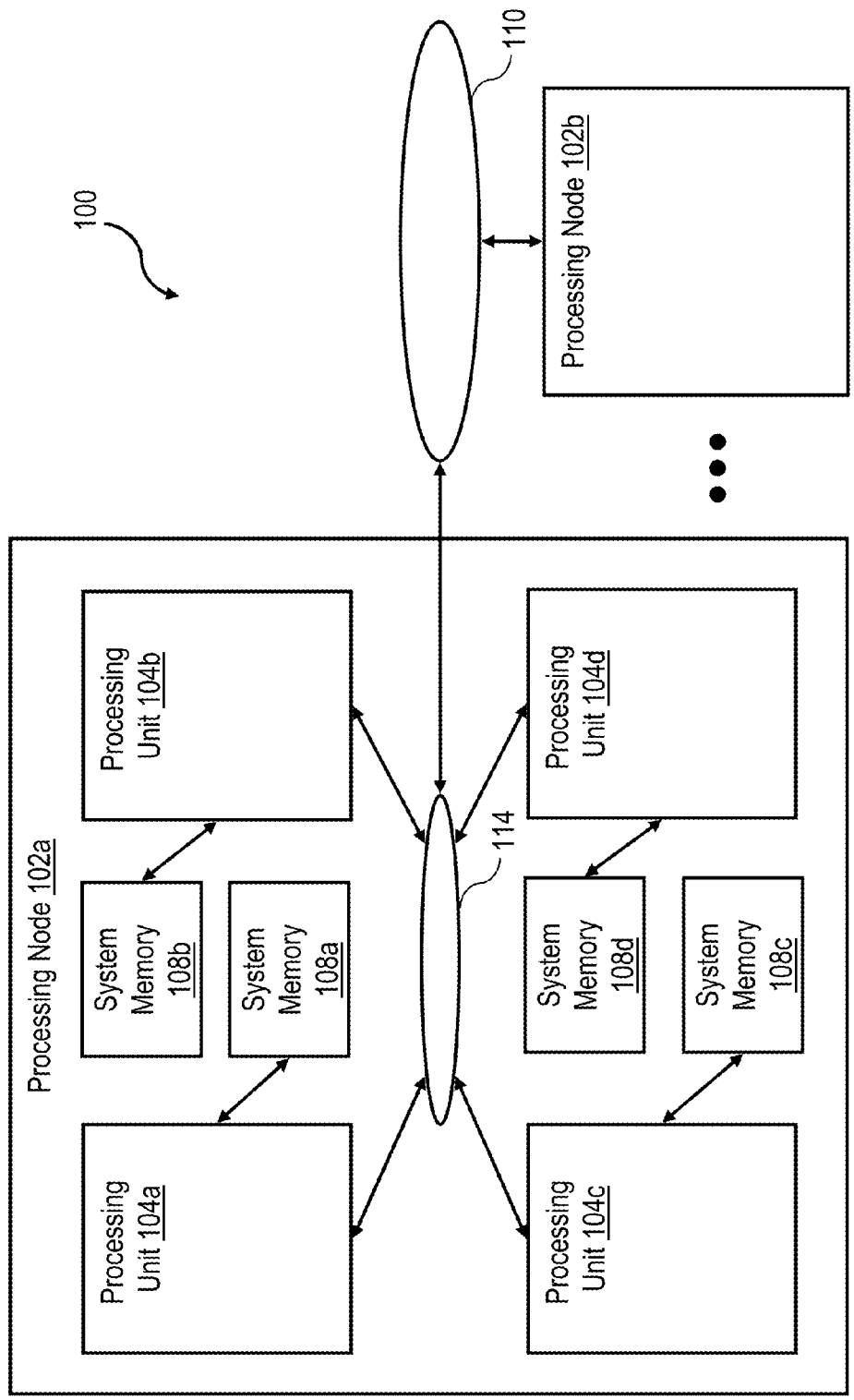
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102a, 102b (and possibly additional processing nodes) for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of volatile storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing system such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access operations and atomicity of store operations.

The ordering of memory operations specifies how memory operations may, if at all, be re-ordered relative to the order of their respective load and store instructions in the individual threads of execution in the multiprocessor program. Memory consistency models must define ordering of memory access operations in four general cases: (1) ordering of the memory operations for a load instruction to a following load instruction, (2) ordering of the memory operations for a load instruction to a following store instruction, (3) ordering of the memory operations for a store instruction to a following store instruction, and (4) ordering of the memory operations for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store operations refers to whether or not a given thread of execution can read the value of its own store operation before other threads, and furthermore, whether the value written to the distributed shared memory system by the store operation becomes visible to other threads in a logically instantaneous fashion or whether the value can become visible to other threads at different points in time. A memory consistency model is called "multi-copy atomic" if the value written by a store operation of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access operations are respected. Therefore, in a data processing system 100 having a distributed shared memory system that implements a weak consistency memory model, so called "barrier" (e.g., SYNC) instructions are typically provided to allow the programmer to specify what memory access operation orderings and atomicity are to be applied during execution of the multi-processor program.

Figure 2:
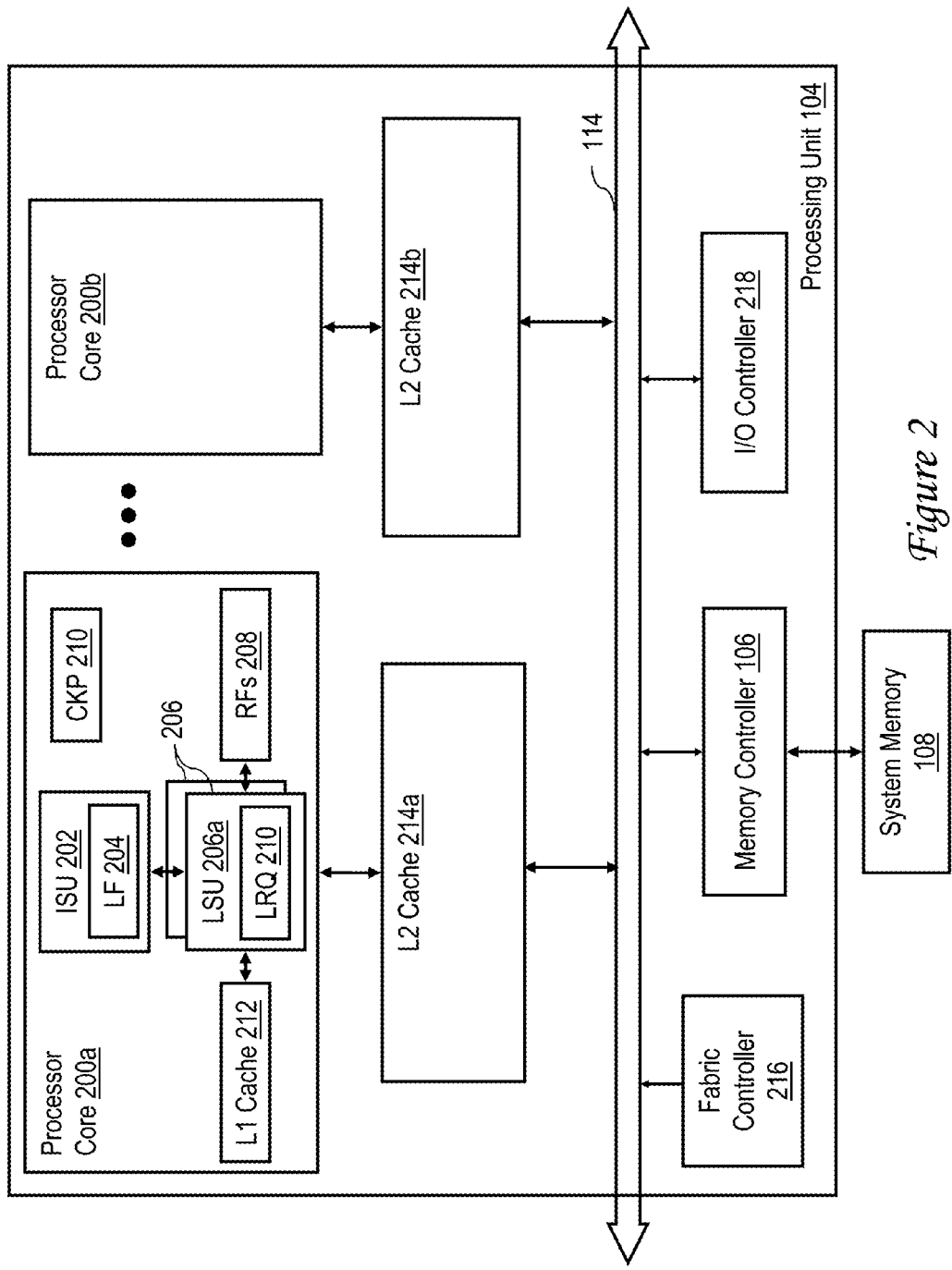
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including two or more processor cores 200a, 200b for processing instructions and data. In some embodiments, each processor core 200 is capable of independently executing multiple simultaneous hardware threads of execution. However, in order to avoid obscuring the invention in the following description processing units 104 are generally described with respect to an embodiment in which each processor core 200 can execute only a single thread at a time. Modifications and/or additions to the described embodiment required to apply the principles and techniques to processing units having processor cores supporting SMT execution that are not explicitly described herein will be apparent to those skilled in the art.

As depicted, each processor core 200 includes an instruction sequencing unit (ISU) 202 that fetches instructions for execution and orders the execution of the instructions. In at least some embodiments, ISU 202 includes a load flag (LF) 204, which as described below, is utilized by ISU 202 to order load instructions with respect to memory transactions. Processor core 200 further includes one or more execution units 206 for executing instructions. Execution units 206 include a load-store unit (LSU) 206a, which executes memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and memory blocks updated by store accesses are written to the distributed shared memory system from the one or more register files 208. LSU 206a includes a load reorder queue 210 that tracks in-flight load instructions until ISU 202 signals that the load instructions have finished execution (whether successfully or unsuccessfully).

The operation of each processor core 200 is supported by a multi-level volatile memory hierarchy having at its lowest level a shared system memory 108 accessed via an integrated memory controller 106, and at its upper levels, one or more levels of cache memory, which in the illustrative embodiment include a store-through level one (L1) cache 212 within and private to each processor core 200, and a respective store-in level two (L2) cache 214 for each processor core 200a, 200b. In order to efficiently handle multiple concurrent memory access requests to cacheable addresses, each L2 cache 214 can be implemented with multiple L2 cache slices, each of which handles memory access requests for a respective set of real memory addresses.

Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 further includes an integrated I/O (input/output) controller 218 supporting the attachment of one or more I/O devices (not depicted).

In operation, when a hardware thread under execution by a processor core 200 includes a memory access instruction requesting a specified memory access operation to be performed, LSU 206a executes the memory access instruction to determine the target address (e.g., an effective address) of the memory access request. After translation of the target address to a real address, L1 cache 212 is accessed utilizing the target address. Assuming the indicated memory access cannot be satisfied solely by reference to L1 cache 212, LSU 206a then transmits the memory access request, which includes at least a transaction type (ttype) (e.g., load or store) and the target real address, to its affiliated L2 cache 214 for servicing. In servicing the memory access request, L2 cache 214 may initiate a transaction including the memory access request on the system fabric, if necessary.

Figure 3:
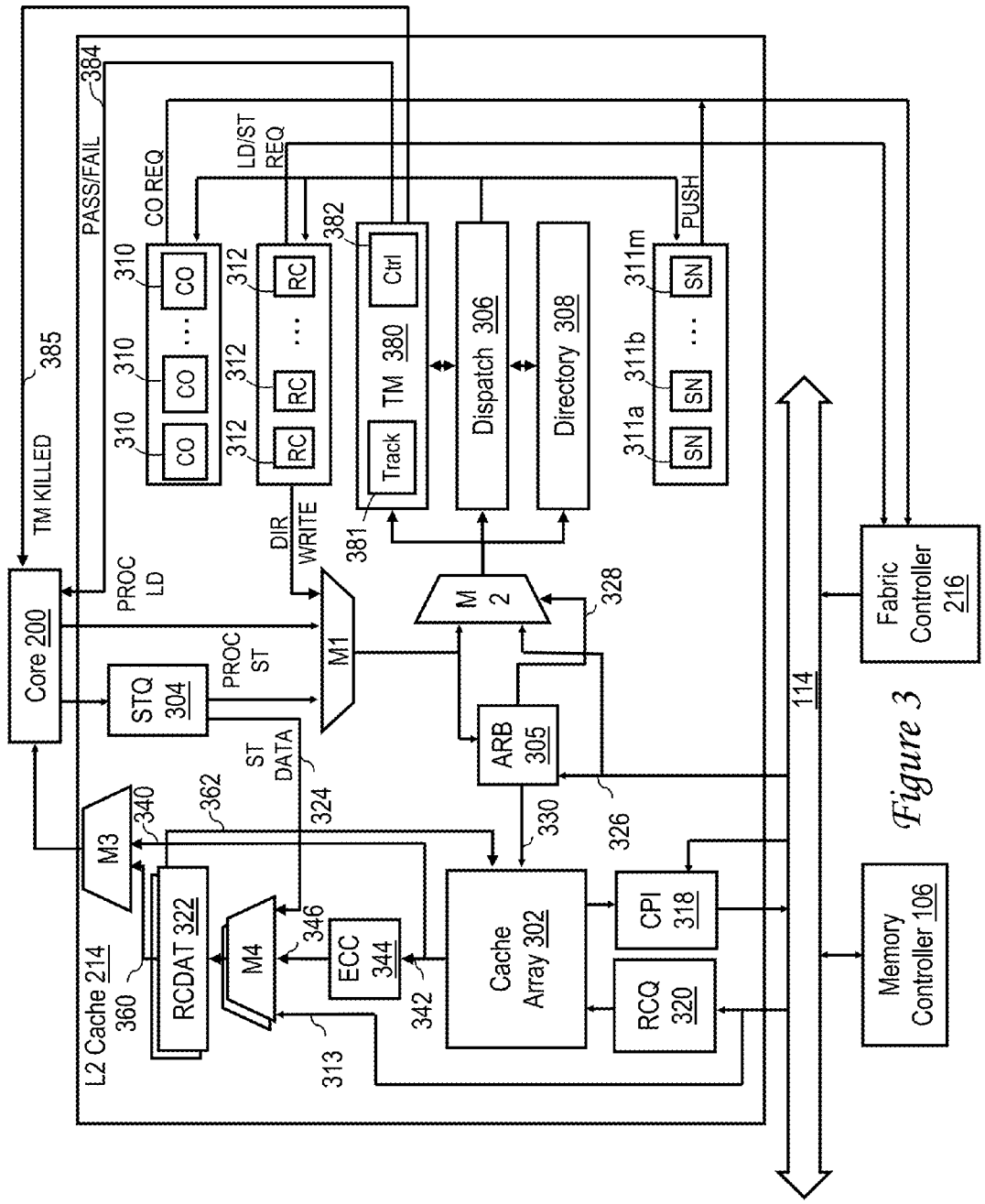
FIG. 3 is a detailed block diagram of lower level cache supporting memory transactions in accordance with one embodiment.

With reference now to FIG. 3, there is illustrated a more detailed block diagram of an exemplary embodiment of a lower level cache (e.g., an L2 cache 214) that supports memory transactions in accordance with one embodiment. As shown in FIG. 3, L2 cache 214 includes a cache array 302 and a directory 308 of the contents of cache array 302. Although not explicitly illustrated, cache array 302 preferably is implemented with a single read port and single write port to reduce the die area required to implement cache array 302.

Assuming cache array 302 and directory 308 are set-associative as is conventional, memory locations in system memories 108 are mapped to particular congruence classes within cache array 302 utilizing predetermined index bits within the system memory (real) addresses. The particular memory blocks stored within the cache lines of cache array 302 are recorded in cache directory 308, which contains one directory entry for each cache line. While not expressly depicted in FIG. 3, it will be understood by those skilled in the art that each directory entry in cache directory 308 includes various fields, for example, a tag field that identifies the real address of the memory block held in the corresponding cache line of cache array 302, a state field that indicate the coherency state of the cache line, an LRU (Least Recently Used) field indicating a replacement order for the cache line with respect to other cache lines in the same congruence class, and inclusivity bits indicating whether the memory block is held in the associated L1 cache 212.

L2 cache 214 includes multiple (e.g., 16) Read-Claim (RC) machines 312 for independently and concurrently servicing load (LD) and store (ST) requests received from the affiliated processor core 200. In order to service remote memory access requests originating from processor cores 200 other than the affiliated processor core 200, L2 cache 214 also includes multiple snoop machines 311. Each snoop machine 311 can independently and concurrently handle a remote memory access request "snooped" from local interconnect 114. As will be appreciated, the servicing of memory access requests by RC machines 312 may require the replacement or invalidation of memory blocks within cache array 302. Accordingly, L2 cache 214 also includes CO (castout) machines 310 that manage the removal and writeback of memory blocks from cache array 302.

L2 cache 214 further includes an arbiter 305 that controls multiplexers M1-M2 to order the processing of local memory access requests and memory transaction requests (corresponding to the tbegin and tend instructions described further herein) received from the affiliated processor core 200 and remote memory access requests snooped on local interconnect 114. Such requests, including local load and store and memory transaction requests and remote load and store requests, are forwarded in accordance with the arbitration policy implemented by arbiter 305 to dispatch logic, such as a dispatch pipeline 306, which processes each memory access request with respect to directory 308 and cache array 302 and, if necessary and the required resource is available, dispatches the memory access request to the appropriate state machine for handling.

As described in greater detail below, L2 cache 214 also includes transactional memory (TM) logic 380, which supports execution of memory transactions by the associated processor core 200. TM logic 380 includes TM tracking logic 381 that tracks transactional memory access (e.g., load and store) instructions within the memory transactions to ensure that they complete in an atomic fashion or fail in the presence of a conflict. TM logic 380 further includes transactional control logic 382, which controls the sequencing of a memory transaction and provides a pass/fail indication 384 and an optional TM killed indication 385 to the associated processor core 200. Pass/fail indication 384 indicates to processor core 200 whether or not a memory transaction successfully committed to the distributed shared memory system at the end of the memory transaction. TM killed indication 385 indicates to processor core 200 whether or not a conflict has occurred during the transaction. In response to transactional control logic 382 asserting TM killed indication 385, processor core 200 may, as a performance optimization, optionally abort and restart memory transaction prior to reaching its end.

L2 cache 214 also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 311, such that CO machines 310 and snoopers 311 direct transfer of data from cache array 302 (e.g., to another L2 cache 214 or to a system memory 108) via only their respective designated CPI buffer entries.

Each RC machine 312 also has assigned to it a respective one of multiple RC data (RCDAT) buffers 322 for buffering a memory block read from cache array 302 and/or received from local interconnect 114 via reload bus 313. The RCDAT buffer 322 assigned to each RC machine 312 is preferably constructed with connections and functionality corresponding to the memory access requests that may be serviced by the associated RC machine 312. RCDAT buffers 322 have an associated store data multiplexer M4 that selects data bytes from among its inputs for buffering in the RCDAT buffer 322 in response unillustrated select signals generated by arbiter 305.

In operation, a processor core 200 transmits store requests comprising a transaction type (ttype), target real address and store data to a store queue (STQ) 304. From STQ 304, the store data are transmitted to store data multiplexer M4 via data path 324, and the transaction type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote memory access request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local memory access request received from multiplexer M1 or the remote memory access request snooped from local interconnect 114 as the next memory access request to be processed.

The memory access request selected for processing by arbiter 305 is placed by multiplexer M2 into dispatch pipeline 306. Dispatch pipeline 306 preferably is implemented as a fixed duration pipeline in which each of multiple possible overlapping requests is processed for a predetermined number of clock cycles (e.g., 4 cycles). During the first cycle of processing within dispatch pipeline 306, a directory read is performed utilizing the request address to determine if the request address hits or misses in directory 308, and if the memory address hits, the coherency state of the target memory block. The directory information, which includes a hit/miss indication and the coherency state of the memory block, is returned by directory 308 to dispatch pipeline 306 in a subsequent cycle. As will be appreciated, no action is generally taken within an L2 cache 214 in response to miss on a remote memory access request; such remote memory requests are accordingly discarded from dispatch pipeline 306. However, in the event of a hit or miss on a local memory access request or a hit on a remote memory access request, L2 cache 214 will service the memory access request, which for requests that cannot be serviced entirely within processing unit 104, may entail communication on local interconnect 114 via fabric controller 216.

At a predetermined time during processing of the memory access request within dispatch pipeline 306, arbiter 305 transmits the request address to cache array 302 via address and control path 330 to initiate a cache read of the memory block specified by the request address. The memory block read from cache array 302 is transmitted via data path 342 to Error Correcting Code (ECC) logic 344, which checks the memory block for errors and, if possible, corrects any detected errors. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 makes a dispatch determination based upon a number of criteria, including (1) the presence of an address collision between the request address and a previous request address currently being processed by a castout machine 310, snoop machine 311 or RC machine 312, (2) the directory information, and (3) availability of an RC machine 312 or snoop machine 311 to process the memory access request. If dispatch pipeline 306 makes a dispatch determination that the memory access request is to be dispatched, the memory access request is dispatched from dispatch pipeline 306 to an RC machine 312 or a snoop machine 311. If the memory access request fails dispatch, the failure is signaled to the requestor (e.g., local or remote processor core 200) by a retry response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of directory 308, if necessary. In addition, the RC machine 312 may perform a cache write to update the relevant cache line of cache array 302. Directory writes and cache writes may be scheduled by arbiter 305 during any interval in which dispatch pipeline 306 is not already processing other requests according to the fixed scheduling of directory reads and cache reads. When all operations for the given request have been completed, the RC machine 312 returns to an unbusy state.

Associated with RC machines 312 is data handling circuitry, different portions of which are employed during the servicing of various types of local memory access requests. For example, for a local load request that hits in directory 308, an uncorrected copy of the target memory block is forwarded from cache array 302 to the affiliated processor core 200 via data path 340 and load data multiplexer M3 and additionally forwarded to ECC logic 344 via data path 342. In the case of an ECC error in the target memory block obtained by the local load request, corrected data is forwarded to RCDAT buffer 322 via data path 346 and store data multiplexer M4 and then from RCDAT 322 to affiliated processor core 200 via data path 360 and load data multiplexer M3. For a local store request, store data is received within RCDAT buffer 322 from STQ 304 via data path 324 and store data multiplexer M4, the store is merged with the memory block read into RCDAT buffer 322 from cache array 302 via ECC logic 344 and store data multiplexer M4, and the merged store data is then written from RCDAT buffer 322 into cache array 302 via data path 362. In response to a local load miss or local store miss, the target memory block acquired through issuing a memory access operation on local interconnect 114 is loaded into cache array 302 via reload bus 313, store data multiplexer M4, RCDAT buffer 322 (with store merge for a store miss) and data path 362.

Referring now to FIG. 4A, an illustrative example of a memory transaction is depicted. Those skilled in the art will recognize that the particular semantics and instructions utilized to implement the various memory transactions described herein are but some of the numerous possible implementations and that the disclosed techniques of implementing transactional memory are not dependent on the specific instructions and instruction semantics employed.

Illustrative memory transaction 400 includes a tbegin instruction 402 that initiates transactional processing, a transaction body 406 including one or more memory access instructions that are to be performed atomically (and optionally one or more additional unillustrated instructions), and a tend instruction 408 that terminates transactional processing. Memory transaction 400 additionally includes a branch instruction 404 immediately following tbegin instruction 402. When memory transaction 400 first executes, the condition code register in processor core 200 upon which branch instruction 404 depends is initialized to a value that causes the program branch indicated by branch instruction 404 not to be taken and the flow of execution to continue to transaction body 406. As discussed below, in response to failure of memory transaction 400, as determined, for example, prior to or at the processing of the tend instruction 408, the condition code register is set to a different value, and branch instruction 404 causes execution to branch to a fail handler routine.

FIG. 4B shows an exemplary process by a processor core 200 processes a tbegin instruction 402 of a memory transaction 400 in accordance with one embodiment. The exemplary method begins at block 410 and then proceeds to block 412. Block 412 illustrates the processor core 200 taking a checkpoint 210 of the architected register state of processor core 200, which can be utilized to restore the state of processor core 200 in the event memory transaction 400 fails. Further, as illustrated at block 414, the processor core 200 that is executing tbegin instruction 402 invokes tracking of load and store instructions within the transaction body 406 (referred to herein as "transactional load" and "transactional store" instructions) to ensure they complete in an atomic fashion or that memory transaction 400 fails in the presence of a conflict. Processor core 200 can invoke tracking of the transactional memory accesses of transaction body 406, for example, by transmitting a TBEGIN request corresponding to tbegin instruction 402 to the affiliated L2 cache 214 for processing by TM logic 380. Thereafter, the processing of the tbegin instruction 402 ends at block 416 of FIG. 4B.

As noted above, tracking of transactional memory access (e.g., load and store) instructions within transaction body 406 to ensure that they complete in an atomic fashion (or that memory transaction 400 fails in the presence of a conflict) is performed by TM tracking logic 381 of L2 cache 214. The transaction footprint includes two portions: the load footprint corresponding to cache lines touched solely by loads within transaction body 406 (e.g., the cache line at address A in exemplary memory transaction 400) and the store footprint corresponding to cache lines touched solely by store instructions or by both load and store instructions in transaction body 406 (e.g., the cache line at address B in exemplary memory transaction 400).

In response to pass/fail indication 384 (or optionally TM killed indication 385) indicating that a conflict has occurred during execution of memory transaction 400, a processor core 200 and its associated cache hierarchy re-establish the architected register state from the checkpoint 210 taken at the execution of tbegin instruction 402, invalidate the tentatively modified cache lines in the store footprint, set the condition code register of processor core 200 such that branch instruction 404 will be taken, and transfer control to branch instruction 404. In addition, processor core 200 sets a transaction failure cause register (not shown) in processor core 200 to indicate the cause of the memory transaction's failure. The fail handler routine invoked by branch instruction 404 may choose to re-attempt memory transaction 400 or fall back to more conventional locking mechanisms, optionally based on the content of the transaction failure cause register.

During the execution of a memory transaction, the values stored to the distributed shared memory system by transaction body 406 (i.e., those in the store footprint of the memory transaction) are visible only to the thread of the processor core 200 executing the memory transaction. Threads running on other processor cores 200 will not "see" these values until and only if the memory transaction successfully commits.

For a memory transaction to successfully commit, the transactional load and store instructions in transaction body 406 must complete in an atomic fashion (i.e., there must be no conflicts for the cache lines in the memory transaction's load and store footprints) and the effects of the store instructions in transaction body 406 must propagate to all processing units 104 in data processing system 100 and invalidate any cached copies of those cache lines held in other processing units 104. If both of these conditions hold when tend instruction 408 is executed, transactional control logic 382 indicates to processor core 200 via pass/fail indication 384 that memory transaction 400 passed and commits all stores performed in transaction body 406 to L2 cache 214, thus making them visible to all other threads in the system simultaneously.

In the following discussion, a load or store instruction will be called "transactional" if that load or store instruction occurs within the transaction body 406 of a memory transaction 400 and is subject to conditional atomic completion as described above. Similarly, a load or store will be called "non-transactional" if it occurs outside a transaction body 406 or within a suspended region of a transaction body, as described below with reference to FIG. 5. In one exemplary embodiment, a conflict policy of data processing system 100 defines a conflict with another processor core's memory access to occur for a given memory transaction in any one of several possible cases. In a first case, a conflict occurs if a non-transactional store from another processor core 200 hits a cache line within either the given memory transaction's load or store footprint. In a second case, a conflict occurs if a transactional store from another processor core 200 hits a cache line within the given memory transaction's load footprint. In a third case, a conflict occurs if a non-transactional load hits a cache line within the given memory transaction's store footprint. In a fourth case, the given memory transaction has a conflict if one of its transactional loads hits an address already extant in the store footprint of another processor core's memory transaction. In a fifth case, the given memory transaction has a conflict if one of its transactional stores hits an address already extant in the store footprint of another processor core's memory transaction. The above conflict policy biases in favor of transactional stores over transactional loads, while allowing transactional and non-transactional loads to freely intermingle. This exemplary conflict policy is but one of several possible embodiments.

With reference now to FIG. 5, there is illustrated a representative memory transaction 500 containing a suspended region. As can be seen by comparison of FIGS. 4 and 5, memory transaction 500 includes a tbegin instruction 502, branch instruction 504, transaction body 506 and tend instruction 508, which correspond to tbegin instruction 402, branch instruction 404, transaction body 406 and tend instruction 408 described above. In addition, memory transaction 500 includes a tsuspend instruction 510 that initiates the start of a suspended region 512. When a memory transaction is suspended through execution of tsuspend instruction 510, the load and store footprints currently established for the enclosing memory transaction containing suspended region 512 remain in place and continue to be tracked by TM tracking logic 381 for conflicts. However, any load or store instructions within suspended region 512 are treated as non-transactional loads and stores and follow existing semantics for such loads and stores. In particular, stores within suspended region 512 are non-transactional and will commit and begin propagating to other processors unconditionally. If a store within suspended region 512 hits either the load or the store footprint of the enclosing memory transaction, a conflict occurs (which also destroys the tentative transactional version of the cache line in the store footprint) and is logged by transactional control logic 382. However, this conflict is not acted on until the enclosing memory transaction is resumed upon execution of tresume instruction 514, at which point the processor core 200 passes control to branch instruction 504 as described. If a non-transactional load instruction within suspended region 512 hits a cache line within the store footprint of the enclosing memory transaction 500, that load instruction returns the tentatively updated value written by a transactional store within the transaction body 506 unless that value has been overwritten by a non-transactional store either by another processor core 200 or by a non-transactional store in suspended region 512, in which case the non-transactional load instruction returns the current value of the target location.

Use of a suspended region 512 allows the temporary suspension of a memory transaction, which permits store instructions in the suspended region 512 to unconditionally update locations in the distributed shared memory system while also allowing for the resumption of the memory transaction at a later time. One possible use for a suspended region 512 is to log debug information into a scratchpad region of the distributed shared memory system and then to resume the enclosing memory transaction. Without a suspended region, the write of the debug information would be rolled back any time the enclosing memory transaction is aborted.

Referring now to FIG. 6A, the execution of an exemplary program illustrating the property of causality in a multiprocessor data processing system is shown. As used herein "causality," which is desirable property in multiprocessor programs, is defined as being preserved if, during execution of a multiprocessor program, a given thread of execution cannot read the effects of a computation before the writes that caused the computation can be read by the given thread.

In the simplified example given in FIG. 6A (as well as those discussed below with reference to FIGS. 6B-6C), a multiprocessor program is executed by three processor cores 200 of data processing system 100, labeled for ease of reference as processor core 0, processor core 1 and processor core 2. In FIG. 6A, processor core 0 executes a store instruction 600 that writes a value of 1 to address A in the distributed shared memory system. This update of address A propagates to processor core 1, and load instruction 610 executed by processor core 1 therefore returns a value of 1. Even though the memory update made by store instruction 600 has propagated to processor core 1, that memory update may not yet have propagated to processor core 2. If store instruction 614 executes on processor 1 and the associated memory update propagates to processor 2 before the memory update of store instruction 600 propagates to processor 2, causality would be violated because the store of the value of 1 to address B, which is an effect of the store to address A, would be visible to processor core 2 before the memory update associated with causal store instruction 600 was visible to processor core 2.

To ensure causality in a weak consistency memory model, barrier instruction 612 (e.g., a SYNC) ensures that store instruction 614 does not take effect or begin propagating its memory update to other processor cores until load instruction 610 has bound to its value. In addition, barrier instruction 612 also ensures that the memory update associated with store instruction 600 propagates to processor 2 before the memory update associated with store instruction 614. Thus, causality is preserved because the cause of the computation (i.e., the memory update of store instruction 600) is visible to processor core 2 before the result of the computation (i.e., the memory update of store 614). A barrier instruction 622 is also executed by processor core 2 to ensure that processor core 2 executes load instructions 620 and 624 and binds their values in order, thus guaranteeing that processor core 2 properly observes the memory updates made by processor core 0 and processor core 1.

With reference now to FIG. 6B, an exemplary embodiment of the multiprocessor program of FIG. 6A rendered in terms of memory transactions is illustrated. In FIG. 6B, the branch instructions to the memory transaction fail handler are omitted for clarity.

As illustrated, processor core 0 executes a memory transaction 630 including a tbegin instruction 632, tend instruction 636, and a transaction body including a store instruction 634 that stores a value of 1 to address A. Upon the execution of tend instruction 636, memory transaction 600 successfully commits and makes the update to address A visible to all the other processor cores simultaneously. In particular, by the time load instruction 642 of the memory transaction 640 executing on processor core 1 can read the value of 1 from address A, load instruction 654 of the memory transaction 650 executing on processor core 2 must also be able to read the value of 1 for address A. Memory transaction 640 then reads the value of 1 for address A, stores a value of 1 to address B and successfully commits. Finally, load instruction 652 of memory transaction 650 reads a value of 1 for address B, and given that memory transaction 640 read a value of 1 for A, load instruction 654 must also read a value of 1 for address A.

In order to make the memory updates of store instructions in a successful transaction visible to all other processor cores simultaneously, before that memory transaction can commit all the cache line invalidates necessitated by the memory transaction must have propagated through the data processing system such that any other processor cores' now stale copies of the updated cache lines have been removed (e.g., invalidated) and can no longer be read by the other processor cores. Without this requirement, a processor core could still read a stale value for an updated memory location after the memory transaction that updated the memory location committed. A processor core, therefore, needs to ensure that the memory updates associated with its own transactional stores are fully propagated through the data processing system to invalidate any stale cached copies before committing a successful memory transaction in order to maintain the semantics of memory transactions. As a consequence of the propagation of the memory updates inherent in the semantics of memory transactions, causality is trivially preserved when only memory transactions are utilized to access memory locations in a distributed shared memory system.

However, when transactional and non-transactional code interact on the same shared variables, causality is not directly preserved by ensuring that the memory updates made by a memory transaction are visible simultaneously to all other processor cores.

Referring now to FIG. 6C, an illustrative multiprocessor program is depicted that includes a mixture of transactional and non-transactional accesses to a distributed shared memory system. In FIG. 6C, the branch instructions to the memory transaction fail handler are again omitted for clarity.

In the exemplary multiprocessor program, processor core 0 executes a non-transactional store instruction 660 that unconditionally writes a value of 1 to address A in the distributed shared memory system. This value propagates to processor core 1 and is read by transactional load instruction 672 within the memory transaction 670 executed by processor core 1. Processor core 1 then executes a store instruction 674 within memory transaction 670 that updates the cache line associated with address B and completes invalidating any stale cached copies of the cache line associated with address B (so that no other processor core holds a copy of the now stale cache line) and successfully commits memory transaction 670 upon execution of tend instruction 676. Processor core 2 then executes load instructions 680 and 684 to read, in order, the cache lines associated with addresses B and A, respectively, based on the ordering enforced by barrier instruction 682. If transaction 670 only ensures that its own memory updates are fully propagated through the distributed shared memory system before committing, the memory update of store instruction 660 may or may not have propagated to processor core 2. Therefore, in at least some operating scenarios, processor core 2 could read a value of 1 for the cache line associated with address B and the, now stale, initial value of 0 for the cache line associated with address A, thus violating causality. The same result would be obtained if processor core 2 utilized transactional loads to read from addresses A and B, as depicted for processor 2 in FIG. 6B.

To guarantee causality, memory transaction 670 must ensure not only that its own transactional stores are propagated throughout the entire distributed shared memory system, but also that any non-transactional store that is read by a transactional load within the transaction has also propagated throughout the distributed shared memory system. (Memory updates of transactional writes that are read by the memory transaction are guaranteed to have propagated throughout the distributed shared memory system because those memory updates could not be read by transaction 670 before they were visible to the entire distributed shared memory system). To ensure that the memory updates of non-transactional stores read by memory transaction 670 are also propagated throughout the distributed shared memory system, the processing of the tend instruction 676 of memory transaction 670 must not allow commitment of memory transaction 670 until the memory update of any non-transactional store read by memory transaction 670 is propagated throughout the distributed shared memory system.

Figure 7:
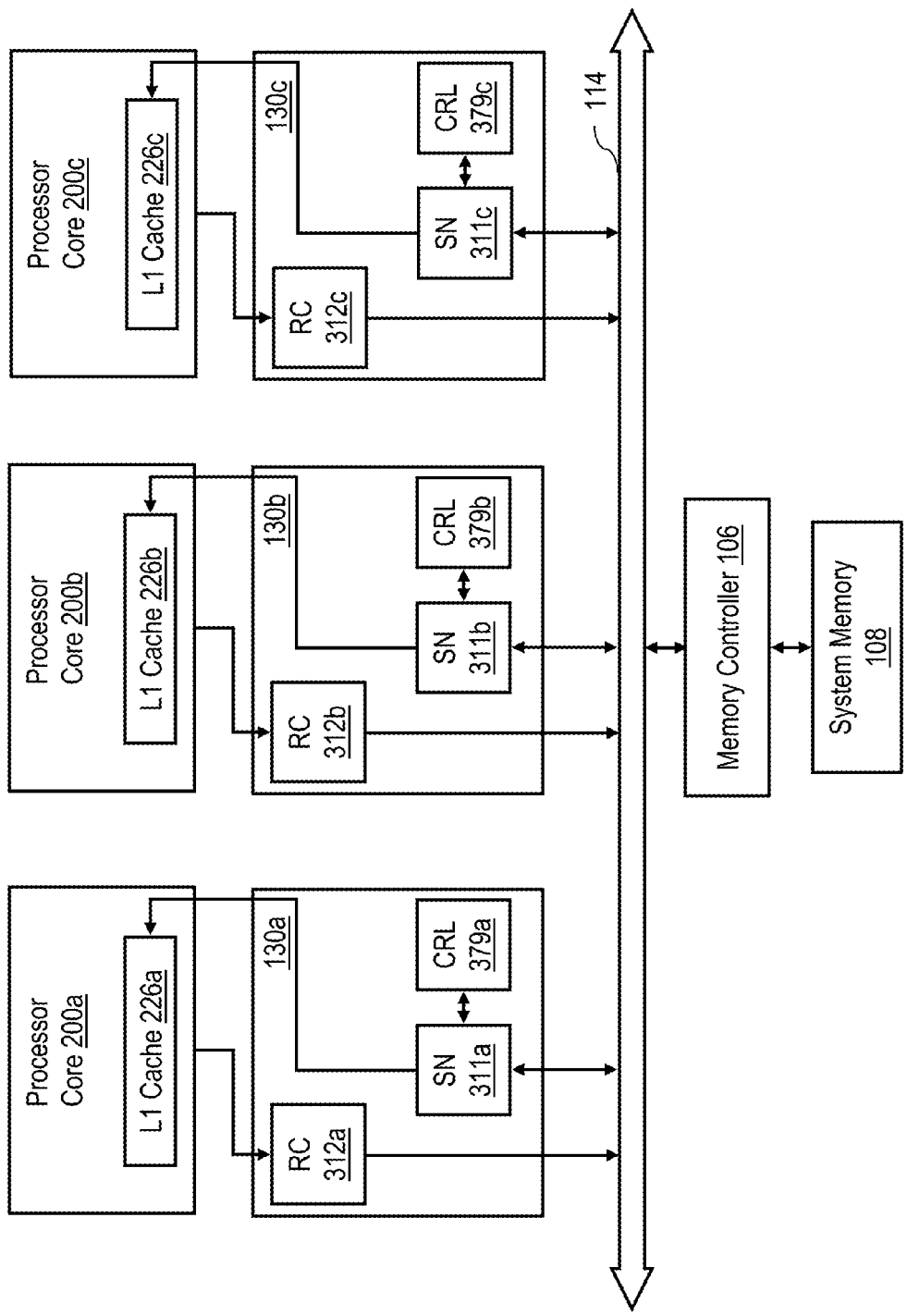
FIG. 7 illustrates a multiprocessor data processing system including at least three processor cores that execute the exemplary program of FIG. 6C.

With reference now to FIG. 7, there is illustrated a partial view of data processing system 100 of FIG. 1, which executes the multiprocessor program of FIG. 6C. In the view given in FIG. 7, processor cores 200a, 200b and 200c respectively correspond to processor cores 0, 1 and 2 of FIG. 6C. Further, an instance of causality resolution logic 379 is instantiated for and coupled to each instance of snooper 311, for example, as a component of the L2 cache 214 affiliated with each processor core 200.

Initially, processor core 200c holds a cached copy of the initial value (e.g., 0) of memory location A in its L1 cache 212c. Processor 200a begins execution of the multiprocessor program of FIG. 6C by executing store instruction 660. In response to execution of store instruction 660, processor core 200a transmits a store request to its L2 cache 214a, which allocates an RC machine 312 to service the store request. RC machine 312 broadcasts the store request onto local interconnect 114, and snoop machine 311c of the L2 cache 214c affiliated with processor core 200c registers the store request, including the processing unit that sourced the store request (i.e., the processing unit including processor core 200a). At this point, the memory update of store instruction 660 has not propagated to processor core 200c, but is instead queued for later processing, advantageously allowing processor core 200a to continue executing further instructions before the memory update of store instruction 660 is fully propagated.

Processor core 200b then executes load instruction 672 and, finding no copy of the target cache line associated with address A in its L1 cache 212b, transmits a read request to its L2 cache 214b. In response to the read request, L2 cache 214b allocates RC machine 312b to service the read request. In response to a miss of the read request in L2 cache 214b, RC machine 312b issues a read request onto local interconnect 114 to obtain the current value for address A. L2 cache 214a responds to the read request and provides the current value of address A to processor core 200b by cache-to-cache intervention. At this point a so-called "causality passing read" has occurred, that is, load instruction 672 has read the value of a store instruction that has not fully propagated through the entire distributed shared memory system. To account for this fact and to protect causality, causality resolution logic 379c in L2 cache 214c notes the successful read intervention between the vertical cache hierarchies of processor cores 200a and 200b for an address that is currently being invalidated by snoop machine 311c. In this manner causality resolution logic 379c directly tracks the causal dependency that processor 200b and its vertical cache hierarchy has on the memory update of store instruction 660 completing its propagation.

Processor 200b executes store instruction 674, which specifies an update of the value of address B to 1. In response to execution of store instruction 674, RC machine 312b issues a store request corresponding to store instruction 674 on local interconnect 114. In absence of an existing cached copy of the target cache line, memory controller 106 supplies the current value of address B from system memory 108 in response to the store request, and RC machine 312b updates L2 cache 214b accordingly. At this point processor core 1 executes tend instruction 676 to attempt to successfully commit transaction 670 and places a corresponding TEND request on local interconnect 114 to ensure that all prior memory updates by transactional stores in memory transaction 670 have been propagated throughout the distributed shared memory system and that any memory updates by non-transactional stores read by memory transaction 670 have similarly propagated throughout the distributed shared memory system. In this case, the memory update of store instruction 674 has fully propagated throughout the distributed shared memory system because no other caches held a copy of the cache line associated with address B. However, had any such copy existed and had the memory update not been fully complete, a snoop machine 311 in those caches, which noted the initial processor core 200 issuing the store, would be active and would provide a retry response to the snooped TEND request from that processor core 200 (forcing the TEND request to be reissued) until the invalidation of the cached copy of the cache line completes.

In the case at hand, the TEND request is not from the processor core 200 that initiated the store request, and therefore snoop machine 311c will not provide a retry response to the TEND request. However, causality resolution logic 379c has a causal dependency for processor 200b and its vertical cache hierarchy and issues on local interconnect 114 a retry response to the TEND request because the TEND request was issued from a processor core 200 that was the recipient of a causality passing read of the same address that snoop machine 311c is processing. In this manner, causality resolution logic 379 directly tracks which processor cores 200 have a causality dependency due to reading a memory update of a non-transactional store that was not fully completed for the processor core with which causality resolution logic 379 is associated.

It should be noted that, in general, causality resolution logic 379 must maintain a list capable of representing all the processors cores 200 in the data processing system to provide causality in cases in which the causality dependency chain passes through more than one processor core (e.g., a test where a first processor stores a location, a second processor reads that location and then stores a first flag variable, a third processor loads the first flag variable and writes a second flag in a transaction, and then a final thread reads the second flag and then the initial location). In such an implementation, a TEND request issued from any processor core with a causal dependency on the target address being invalidated by the snoop machine 311 associated with the instance of causality resolution logic 379 is retried. In a large SMP, however, such an embodiment can be prohibitive in cost and many implementations of causality resolution logic 379 only precisely track causal dependency chains of a certain fixed depth (e.g., two or three processors) and in the presence of longer dependency chains resort to pessimistically retrying all TEND requests until the cache line invalidations necessitated by the store instruction have completed processing.

To summarize, causality resolution logic is utilized to detect the occurrence of causal dependency chains, to a depth determined by the embodiment, on a pending store that has not completed processing throughout the entire distributed shared memory system. These causal dependencies are utilized to stall the completion of TEND requests from those processor cores with a causal dependency on the incomplete (pending) stores. In this manner, the memory transaction cannot complete (and therefore make its own stores visible), until the stores the memory transaction has read (i.e., those in the causal dependency chain of the memory transaction) have first completed throughout the distributed shared memory system. Only after these stores in the memory transaction's causal dependency chain (and the transactional stores of the memory transaction itself, though this is guaranteed by snooper 311 instead of causality resolution logic 379) have completed, may the TEND request complete, leading to the memory transaction successfully committing if no conflicts have occurred during its execution.

In other embodiments, additional causality resolution logic may be required to ensure the causality of memory operations. For example, in an implementation that contains a write-through L1 cache shared by a multithreaded processor core followed by a shared L2 store queue, it is possible for different threads (i.e., logically different processor cores from the point of view of software) to read stored values from the L1 cache before these stores have even propagated to the L2 cache, much less to the entire distributed shared memory system. In such an implementation, the tend instruction must act as a barrier for transactional stores in the given thread. This behavior ensures that the transactional stores are propagated to the system interconnect and the necessary snoop machines 311 so that the tend instruction can ensure, when trying to complete the memory transaction, that all of the cache line invalidations required by the memory transaction's stores have fully propagated. In addition, the tend instruction must act as a barrier for non-transactional stores that have been (or may have been) read by transactional loads within the transaction. In the simplest (and most common embodiment), all non-transactional stores within the shared store queue are treated as if they have come from a single thread for purposes of retrying the TEND request.

In this manner, all non-transactional stores from which any transaction has (or may have) read that have not been fully propagated are broadcast to snoop machines 311 as necessary before a TEND request for any transaction from that multithreaded processor core is presented on local interconnect 114. In such an embodiment, snoop machines 311 treat all stores coming from a given multithreaded processor core in a unified manner and will retry any TEND request, as necessary, from that given multithreaded processor core regardless of thread. In this embodiment, causality resolution logic 379 is not involved in monitoring these intra-core dependencies, but instead is utilized solely to manage causality dependencies between multithreaded processor cores.

The exact placement and details of the necessary causality resolution logic will vary with the particulars of given embodiment and will be apparent to those skilled in the art given the teachings herein. In general, at any point where a load may return the value of a store that has not fully propagated throughout the entire distributed shared memory system, if causality is to be preserved a mechanism must be provided to ensure that any store with a causal dependency to a different processor core is noted and that causal dependency delays the processing of a tend instruction (or other semantic) ending a memory transaction until such time as the stores in the causal dependency chain of the memory transaction have completed propagating.

Figure 8:
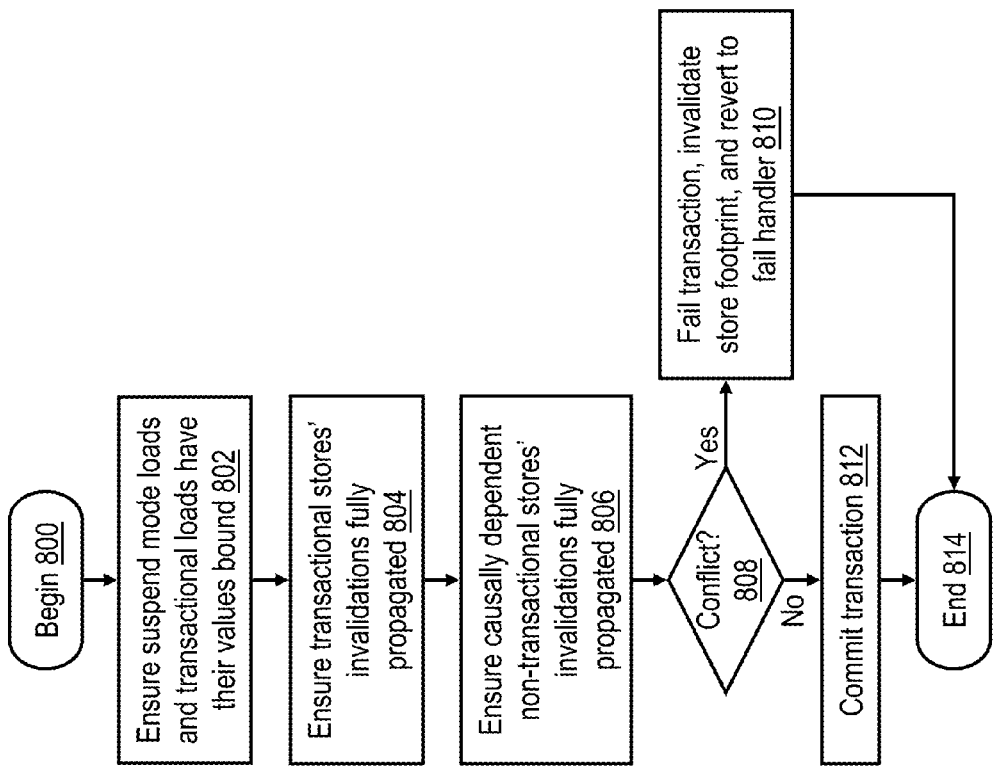
FIG. 8 is a high level logical flowchart of an exemplary method by which a multiprocessor data processing system ensures causality in execution of a program including both transactional and non-transactional memory accesses.

Referring now to FIG. 8, there is depicted a high level logical flowchart of the processing of a tend instruction terminating a memory transaction in accordance with one embodiment. The process begins at block 800, for example, in response to execution of a tend instruction within the LSU 206a of a processor core 200. The process of FIG. 8 proceeds from block 800 to block 802, which depicts LSU 206a ensuring that all prior suspend mode load instructions and all prior transactional load instructions have their values bound. This check ensures the transactional load instructions are present in the memory transaction's footprint and that the suspend mode load instructions have obtained their values. The process proceeds from block 802 to block 804, which depicts ensuring that the cache line invalidations necessitated by transactional stores within the memory transaction have been fully propagated throughout the distributed shared memory system. In the embodiment described above, verification of propagation of the cache line invalidations necessitated by transactional stores is accomplished by one or more snoop machines 311 providing a retry response to any applicable TEND request on local interconnect 114 until the previous transactional stores have invalidated all cached copies of the memory location(s) targeted by the memory updates. The process then proceeds to block 806, which illustrates ensuring that the cache line invalidations necessitated by causally dependent non-transactional stores have completely propagated throughout the distributed shared memory system. In the embodiment described above, verification of propagation of the cache line invalidations necessitated by non-transactional stores is accomplished by one or more instances of causality resolution logic 379 providing a retry response to any applicable TEND request on local interconnect 114 until the previous memory updates of causally dependent non-transactional stores have invalidated all cached copies of the memory location(s) targeted by the memory updates.

At block 808, transactional control logic 382 determines whether or not a conflict has occurred for the memory transaction. In response to transactional control logic 382 determining that a conflict has occurred, the process proceeds to block 810, which depicts transactional control logic 382 invalidating the tentative store footprint of the memory transaction (e.g., as recorded in L2 cache 214) and indicating via pass/fail indication 384 that the memory transaction has failed. As further illustrated at block 810, in response to pass/fail indication 384 processor core 200 updates its condition code register and transfers control to the fail handling branch instruction within the memory transaction. The process then terminates at block 814.

Returning to block 808, in response to transactional control logic 382 determining that no conflict has occurred during execution of the memory transaction, the process proceeds to block 812, which depicts TM control logic 382 committing the transaction, inter alia, by causing the transaction footprint to be committed to the distributed shared memory system (e.g., by updating one or more coherence states in the directory 308 of L2 cache 214 to indicate the transaction footprint is valid and available for access by all threads) and indicating to processor core 200 via pass/fail indication 384 that the memory transaction passed. The process then terminates at block 814.

Unless mandated differently by a particular programming model, program ordering of instructions does not generally imply any particular execution ordering between a memory transaction and the non-transactional memory access instructions (e.g., load and store instructions) preceding the memory transaction and the non-transactional load instructions following the memory transaction. For example, turning to FIG. 9, an exemplary prior art code segment 900 is illustrated. Code segment 900 includes non-transactional load and store instructions 902 and 904 that precede in program order a memory transaction 908 including transactional load and store instructions 910 and 912. Following memory transaction 908 in program order are non-transactional load and store instructions 916 and 918. Because of the lack of implied execution ordering, the non-transactional load instruction 916 following memory transaction 908 in program order, transactional memory access instructions 910 and 912, and the non-transactional memory access instructions 902 and 904 preceding memory transaction 908 in program order can generally be executed in any relative order, subject to the observance of intra-thread data dependencies enforced by conventional hazard detection logic. It should be noted that the non-transactional store instruction 918 that follows memory transaction 908 in program order cannot be executed until memory transaction 908 commits to the distributed shared memory system. The reason for this restriction is that until memory transaction 908 commits, non-transactional store instruction 918 necessarily remains speculative because memory transaction 908 may fail and execution may branch to the fail handler, causing non-transactional store instruction 918 to never be executed. Thus, non-transactional store instructions following memory transactions are speculative until commitment of the memory transactions and cannot be executed speculatively.

The present invention recognizes that in many cases it would useful and desirable to order a memory transaction relative to the non-transactional load and store instructions preceding and following the memory transaction. As shown in the exemplary code segment 900 set forth in FIG. 9, in the prior art such ordering (if desired) was accomplished by the programmer placing an explicit barrier instruction (e.g., SYNC) before and after the memory transaction 908 in program order. Thus, the programmer would have to place a first SYNC instruction 906 prior to memory transaction 908 in program order and a second SYNC instruction 914 immediately following memory transaction 908 in program order.

In general, barrier instructions such as SYNC instructions 906 and 914 ensure that (1) load instructions (e.g., non-transactional load instruction 902) preceding the barrier instruction in program order have had their data values bound (if not delivered into the appropriate core register file), and (2) any store instruction preceding the barrier instruction in program order (e.g., non-transactional store instruction 904) has propagated its store data values to all other processor cores, and (3) any stores by other processor cores whose values have been read by a load instruction of this processor core that precedes the barrier instruction in program order have propagated to all other processor cores before any load instruction following the barrier instruction has its value bound and store data of any store instruction following the barrier instruction in program order becomes visible to any other processor core. Given the foregoing requirements of barrier instructions, some simple implementations will enforce the effects of a barrier instruction simply by stalling execution of the load and store instructions following the barrier instruction in program order until the load instructions preceding the barrier instruction in program order have their values bound and the store data values of store instructions preceding the barrier instruction in program order have propagated to all other processor cores and, as explained above regarding cumulativity, the stores data values read by load instructions preceding the barrier instruction in program order have fully propagated to all other processor cores. In summary, a barrier instruction, such as SYNC instructions 906 and 914, controls the execution ordering of the memory access instructions on the issuing thread relative to the issuing processor core. In addition, a barrier instruction controls the relative ordering of the visibility to other processor cores of memory accesses preceding the barrier instruction in program order to accesses following the barrier instruction in program order.

Because of their many execution ordering dependencies and potential for stalling execution of memory access instructions, the manner in which barrier instructions are executed can have a significant positive or negative impact on execution performance. In an attempt to improve performance, some conventional systems have implemented a mechanism that permits load instructions following a barrier instruction in program order to begin execution and possibly tentatively bind their data values before execution of the barrier instruction has completed. In such implementations, load tracking logic within the system monitors for any changes to the data values to which the load instructions have tentatively bound. At the point the barrier instruction is ready to complete, the load tracking logic determines which load instructions, if any, that have tentatively bound data values have had those data values change. Because such data values are no longer valid, the associated load instructions must be re-executed. However, for load instructions tentatively bound to data values to which no intervening update has been made, the net effect is as if the load instructions were executed immediately following completion of the barrier instruction, even though the load instructions actually bound their data value earlier. It should be noted that this prior art optimization comes at the expense of complex load tracking hardware, which, if even implemented, is a finite resource that limits the number of load instructions that can be tentatively executed in advance of a barrier instruction. It should also be noted that this optimization is inapplicable to non-transactional store instructions following a barrier instruction in program order (i.e., non-transactional store instructions following a barrier instruction in program cannot be executed before the barrier instruction completes) because non-transactional store instructions cannot be executed speculatively.

The present invention appreciates that instead of relying on explicit barrier instructions to enforce desired execution ordering of memory access instructions preceding and following a memory transaction relative to each other and to the memory transaction, the effect of barrier instructions enclosing a memory transaction as shown in FIG. 9 can instead be achieved by imbuing the instructions initiating and terminating a memory transaction (e.g., tbegin and tend) with semantic effects equivalent to the explicit leading and trailing barrier instructions, where such barrier-like ordering effect are applied when, and only if, the memory transaction is successful. In at least some embodiments, this additional ordering effect can be applied selectively by implementing different forms of tbegin and tend instructions that would be paired together at the outermost extent of a memory transaction.

In at least one embodiment, the implicit execution ordering effect of instructions initiating and terminating a memory transaction is implemented utilizing transactional memory logic (e.g., TM logic 380), and specifically, TM tracking logic 381. In a memory transaction, transactional load and store instructions are not ordered or visible with respect to other processor cores until the memory transaction successfully commits. The present invention appreciates that this behavior allows ordering effects of leading and trailing barrier instructions to be largely subsumed into processing the tend instruction terminating a memory transaction, as described further below.

Referring now to FIG. 10, there is depicted an exemplary code segment 1000 including non-transactional load and store instructions 1002 and 1004, which precede in program order a memory transaction 1008 including transactional load and store instructions 1010 and 1012. Following memory transaction 1008 in program order are non-transactional load and store instructions 1016 and 1018, respectively.

In this example, to imbue tbegin instruction 1009 of memory transaction 1000 with implicit barrier semantics, four execution orderings must be ensured: load-to-load (e.g., ld A 1002 to ld C 1010), load-to-store (e.g., ld A 1002 to st D 1012), store-to-load (e.g., st B 1004 to ld C 1010), and store-to-store (e.g., st B 1004 to st D 1012). In addition, to ensure cumulativity, store data values of non-transactional stores that are read by load instructions preceding the memory transaction in program order (e.g., ld A 1002) must propagate to all other processor cores before any data value of a transactional store (e.g., st D 1012) can propagate to those processor cores.

For load-to-load ordering, two execution scenarios can occur. First, the load instructions can naturally bind their respective data values in program order, in which case the implicit barrier semantics are already preserved, and nothing needs to be done. Second, the load instructions can bind out-of-order with respect to program ordering (e.g., ld C 1010 binds to its data value before ld A 1002). Binding the data value of ld C 1010 before ld A 1002 does not, in itself, violate the implicit barrier semantics of tbegin instruction 1009. If the data value of ld C 1010 remains unchanged until after the data value of ld A 1002 is bound, the load-to-load ordering required by the barrier instruction is still preserved.

Because ld C 1010 is a transactional load instruction, TM tracking logic 381 as previously described monitors for changes to the bound data value until memory transaction 1008 is committed to the shared distributed memory system to ensure that the memory transaction is executed atomically. The present invention can therefore prevent tend instruction 1013 from completing execution before the data value of ld A 1002 is bound. Doing so ensures that the data value of ld C 1010, if it bound before the data value of ld A 1002, is unchanged until after the data value of ld A 1002 is bound if memory transaction 1008 commits. Memory transaction 1008 will not complete until ld A 1002 is bound, and if the data value of ld C 1010 changes before memory transaction 1008 completes, memory transaction 1008 will fail. This behavior ensures that the load-to-load ordering required by the barrier implicit in tbegin instruction 1009 is honored. It should be noted that this execution ordering is ensured by TM tracking logic 381 tracking ld C 1010 and does not utilize any resources in the conventional tracking mechanism for load speculation past a barrier instruction, if implemented.

A similar mechanism ensures store-to-load execution ordering (e.g., execution ordering between st B 1004 and ld C 1010). If ld C 1010 binds to a data value before the store data value of st B 1004 propagates to all other processor cores, a violation of the barrier semantics can occur if the data value to which ld C 1010 bound changes before the store data value of st B 1004 fully propagates to all processor cores. To prevent this violation of barrier semantics, the present invention prevents memory transaction 1008 from committing at tend instruction 1013 until after the store data value of st B instruction 1004 has fully propagated to all other processor cores. At the point that the store data value of st B 1004 has fully propagated to all other processor cores, if memory transaction 1008 can still be successfully committed, the value bound by ld C 1010 has not changed (whether bound before or after the propagation of the store data value of st B 1004 to the various processor cores), and the system state appears as if ld C 1010 bound its data value after the store data value of st B 1004 propagated to all other processor cores, meaning the requirements of the barrier implicit in tbegin instruction 1009 are honored. It should be noted that if st B 1004 and ld C 1010 access the same or overlapping memory locations, the well known hazard detection logic implemented by ISU 202 will also ensure the proper execution ordering of these instructions and cause ld C 1010 to read the value written by st B 1004.

To ensure the load-to-store execution ordering of the barrier implicit in tbegin instruction 1009, ld A 1002 must have bound its data value before the store data value of st D 1012 can propagate to any other processor core. The present invention prevents memory transaction 1008 from committing to the distributed shared memory system until ld A 1002 is bound, and until memory transaction 1008 commits, the store data value of st D 1012 is not visible to any other processor core. Consequently, the appearance of load-to-store ordering required by the barrier implicit in tbegin instruction 1009 is ensured if the memory transaction commits even though the transactional st D 1012 may execute tentatively within memory transaction 1008 before ld A 1002 binds to a data value. As with the store-to-load ordering case, conventional hazard detection logic within ISU 202 ensures that ld A 1002 reads the earlier value if ld A 1002 and st D 1012 access the same or overlapping memory locations.

To ensure the store-to-store execution ordering of the barrier implicit in tbegin instruction 1009, the store data value of st B 1004 must propagate to all processor cores before the store data value of st D 1012 can propagate to any other processor core. The present invention prevents memory transaction 1008 from committing to the distributed shared memory system until the store data value of st B 1004 has propagated to all other processor cores, and until memory transaction 1008 commits, the store data value of st D 1012 is not visible to any other processor core. Therefore, the appearance of store-to-store ordering required by the barrier implicit in tbegin instruction 1009 is ensured even though transactional st D 1012 may execute tentatively in memory transaction 1008 before st B 1004 has propagated to all other processor cores. As with the store-to-load and load-to-store cases, conventional hazard detection logic ensures st B 1004 and st D 1012 execute in order if the target memory locations are the same or overlap.

Finally, to ensure the cumulative effect of the barrier implicit in tbegin instruction 1009, any store data values of non-transactional stores by other processor cores that are read by load instructions preceding memory transaction 1008 in program order (e.g., ld A 1002) must be propagated before the store data values of transactional store instructions (e.g., st D 1012) to any other processor core. This requirement is enforced by delaying completion of memory transaction 1008 until such store data values have fully propagated.

To summarize, to enforce an implicit barrier in an instruction initiating a memory transaction, the memory transaction is prevented from completing until all prior non-transactional load and store instructions have completed and all non-transactional stores by other threads that are read by non-transactional load instructions preceding the memory transaction in program order have also completed. At the end of the memory transaction, if the memory transaction can still successfully commit, any transactional load instruction that bound earlier than it would have if an explicit barrier instruction had been inserted immediately preceding the memory transaction has necessarily not had the data value to which it bound change, and the barrier semantics have not been violated. Further, because transactional stores are not visible to other threads until the memory transaction commits, the barrier semantics for store instructions are also satisfied. By delaying the completion of the memory transaction until barrier semantics are enforced, the barrier effect is much more efficiently implemented because the execution of transactional load and store instructions may overlap in time with the prior non-transactional load and store instructions without any violation of barrier semantics. Any violation of the required barrier semantics is detected naturally by the TM tracking logic (e.g., TM tracking logic 381), which will necessarily be implemented in any system supporting memory transactions. Leveraging this TM tracking logic efficiently handles the semantics of both memory transactions and implicit barriers and alleviates the stalling of memory access instructions inherent in traditional barrier implementations.

In order to imbue tend instruction 1013 of memory transaction 1000 with an implicit barrier effect, the same four execution orderings listed above must be preserved: load-to-load (e.g., ld C 1010 to ld E 1016), load-to-store (e.g., ld C 1010 to st F 1018), store-to-load (e.g., st D 1012 to ld E 1016), and store-to-store (e.g., st D 1012 to st F 1018). For cumulativity, store data values generated by other threads that are read by transactional load instructions within memory transaction 1008 (e.g., ld C 1010) must also be propagated to all other processor cores ahead of store data values of store instructions following memory transaction 1008 (i.e., st F 1018), as described above with reference to block 806.

As described above, non-transactional st F 1018 cannot be executed until memory transaction 1008 commits to the distributed shared memory system because st F 1018 cannot be executed speculatively. This inherent characteristic of memory transactions inherently provides the needed load-to-store and store-to-store barrier ordering for tend instruction 1013. For load-to-load and store-to-load execution orderings, ISU 202 can either prevent ld E 1016 from executing until memory transaction 1008 commits or, prior to commitment of memory transaction 1008, speculatively execute non-transactional ld E 1016 to tentatively bind the data value of ld E 1016. If ld E 1016 is speculatively executed, once memory transaction 1008 commits, load-to-load and store-to-load execution ordering can be enforced if the tentatively bound data value has changed by discarding the tentatively bound data value and re-executing ld E 1016. By making the barrier semantics implicit in tend instruction 1013, the fetch and execution overhead of an explicit barrier instruction is avoided.

In the foregoing description, barrier semantics are described with reference to memory transactions lacking suspended regions. For those memory transactions having a suspended region, additional processing is employed to ensure proper execution ordering with respect to the non-transactional memory access instructions within the suspended region. For example, FIG. 11 illustrates an exemplary code segment 1100 including non-transactional load and store instructions 1102 and 1104 that precede in program order a memory transaction 1106 including transactional load and store instructions 1108, 1118 and 1110, 1120 as well as a suspended region 1112 including non-transactional load and store instructions 1114 and 1116.

If tbegin instruction 1107 that initiates memory transaction 1106 has implicit barrier semantics as described above, no direct action is taken at execution of tbegin 1107 to implement the barrier effects of tbegin 1107 for transactional memory accesses 1108, 1110, 1118 and 1120, as these barrier effects can be applied when tend instruction 1121 is executed, as described above. However, non-transactional memory access instructions within a suspended region (e.g., non-transactional load and store instructions 1114 and 1116) must additionally be ordered relative to non-transactional memory access instruction preceding memory transaction 1106 in program order (e.g., non-transactional load and store instructions 1102 and 1104) if tbegin instruction 1107 has implicit barrier semantics. In essence, the barrier effects of tbegin instruction 1107 are not immediately enforced, and TM tracking logic 381 is utilized to achieve the equivalent effects for transactional memory access in a memory transaction that commits as described above. However, if a suspended region such as suspended region 1112 is encountered, the barrier effects of tbegin 1107 must be immediately enforced in order to ensure that non-transactional memory access instructions 1102, 1104 preceding memory transaction 1106 in program order are executed with the appropriate ordering relative to non-transactional memory access instructions 1114, 1116 within suspended region 1112.

Figure 12:
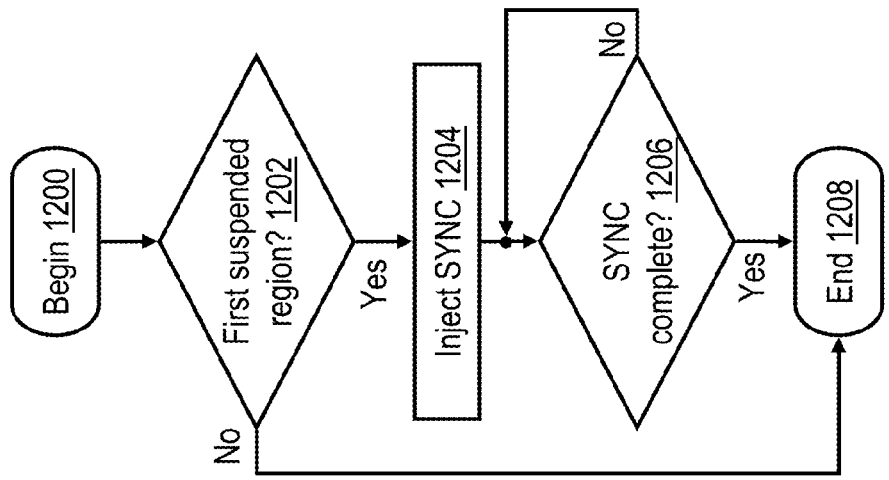
FIG. 12 is a high level logical flowchart of an exemplary method of enforcing a barrier at the beginning of an initial suspended region of a memory transaction in accordance with one embodiment.

To enforce the barrier effects of tbegin 1107 on the non-transactional memory access instructions within suspended region 1112, a barrier instruction (e.g., SYNC) is dynamically inserted into the instruction stream, as shown in FIG. 12. The process of FIG. 12 begins at block 1200 in response to detection by ISU 202 of a tsuspend instruction 1111 initiating suspended region 1112. The process proceeds from block 1200 to block 1202, which illustrates ISU 202 determining whether the tsuspend instruction belongs to a first suspended region within the memory transaction or whether a prior suspended region has been encountered within the same memory transaction. In response to a determination at block 1202 that the tsuspend instruction does not initiate a first suspended region within the memory transaction, the process of FIG. 12 terminates at block 1208 as no further barrier enforcement is necessary for the current suspended region. However, in response to a determination at block 1202 that the tsuspend instruction (e.g., tsuspend instruction 1111) belongs to a first suspended region within the memory transaction, ISU 202 dynamically injects a barrier instruction (e.g., SYNC) into the instruction pipeline (block 1204). This barrier instruction is processed as if the barrier instruction were the first instruction in the suspended region (e.g., suspended region 1112) and immediately satisfies all the execution ordering requirements of the barrier implicit in tbegin instruction 1107 for the non-transactional memory access instructions preceding the memory transaction (e.g., ld A 1102 and st B 1104) and non-transactional memory access instructions (e.g., ld E 1114 and st F 1116) within suspended region 1112. The injected barrier instruction has no impact on transactional memory access instructions (e.g., ld C 1108 and st D 1110) because these memory access instructions are not actually completed relative to other processor cores until memory transaction 1106 successfully commits. As further indicated in FIG. 12, the processing of tsuspend instruction 1111 ends at block 1208 in response to execution of the injected barrier instruction completing at block 1206.

Figure 13:
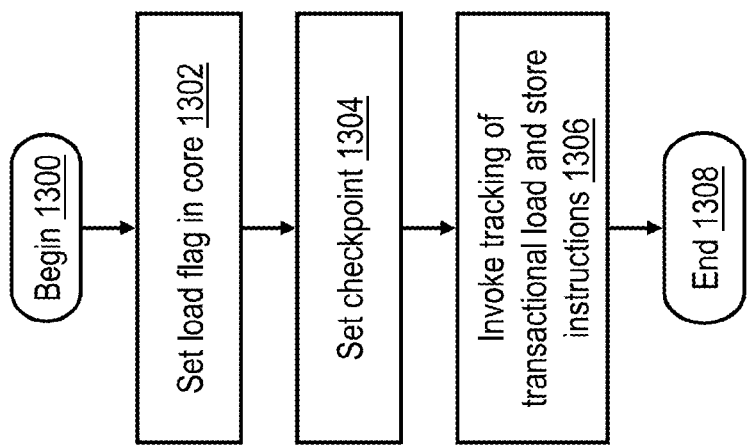
FIG. 13 is a high level logical flowchart of an exemplary method by which an instruction initiating a memory transaction is executed in accordance with one embodiment.

Referring now to FIG. 13, shows an exemplary process by which a processor core 200 processes a tbegin instruction having an implicit barrier effect in accordance with one embodiment. The exemplary method begins at block 1300 in response to ISU 202 fetching a tbegin instruction for execution and then proceeds to block 1302, which illustrates ISU 202 setting a load flag (LF) 204 in the processor core 200. In embodiments that do not support speculative execution of load instructions following barriers in program order, when LF 204 is set, ISU 202 inhibits the dispatching of all non-transactional load instructions following the current memory transaction in program order. Alternatively, in more aggressive implementations that support speculative execution of load instructions following barriers in program order, when LF 204 is set, ISU 202 causes any load instructions following the final tend instruction ending the memory transaction that are speculatively executed in advance of the memory transaction committing to be tracked by LRQ 210 for invalidation in the event the loaded data value changes prior to commitment of the memory transaction.

The process then proceeds from block 1302 to block 1304, which illustrates the processor core 200 taking a checkpoint 210 of the architected register state of processor core 200, which can be utilized to restore the state of processor core 200 in the event memory transaction 400 fails. Further, as illustrated at block 1306, the processor core 200 invokes tracking of transactional load and store instructions within the transaction body to ensure they complete in an atomic fashion or that the memory transaction fails in the presence of a conflict. Processor core 200 can invoke tracking of the transactional memory accesses of the transaction body, for example, by transmitting a TBEGIN request corresponding to tbegin instruction to the affiliated L2 cache 214 for processing by TM logic 380. Thereafter, the processing of the tbegin instruction ends at block 1308 of FIG. 13.

Figure 14:
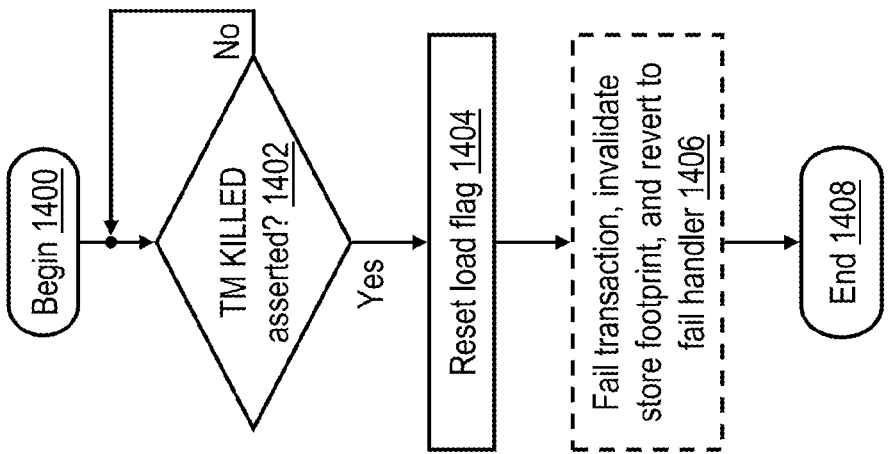
FIG. 14 is a high level logical flowchart of an exemplary method by which failure of a memory transaction resets a load flag in a processor core in accordance with one embodiment.

With reference now to FIG. 14, there is illustrated a high level logical flowchart of an exemplary method by which failure of a memory transaction resets a load flag in a processor core in accordance with one embodiment. The process of FIG. 14 begins at block 1400 and then proceeds to block 1402, which illustrates ISU 202 monitoring for receipt of a TM KILLED indication 385 indicating that a currently executing memory transaction has failed. In response to receipt of TM KILLED indication 385, ISU 202 resets LF 204 (block 1404). In embodiments that do not support speculative execution of non-transactional load instructions following the memory transaction in program order, resetting LF 204 enables any such non-transactional loads to be dispatched by ISU 202. In alternative embodiments permitting speculative execution of such non-transactional load instructions prior to commitment of the preceding memory transaction, resetting LF 204 enables ISU 202 to halt tracking by LRQ 210 of such non-transactional load instructions for invalidation. These effects of resetting of LF 204 occur because the barrier implicit in tend instructions is only enforced if the memory transaction succeeds. As indicated at block 1406 by dashed line illustration, in response to TM KILLED indication 385, a processing unit 104 may optionally immediately take action to fail the transaction, for example, by invalidating the tentative store footprint of the memory transaction (e.g., as recorded in L2 cache 214), updating the condition code register on which the fail handler branch depends, and transferring control to the fail handling branch instruction within the memory transaction. It should be noted that if optional block 1406 is implemented instead of waiting to fail the memory transaction at execution of the tend instruction terminating the memory transaction, the barriers implicit in the tbegin and tend instructions of the memory transaction are preferably not enforced. It should also be noted that if optional block 1406 is implemented, there is no guarantee non-transactional load instructions following the failed memory transaction will ever get executed. However, if such load instructions do in fact execute, ISU 202 may be able to use the data retrieved into register files 208 by the load instructions.

Figure 15:
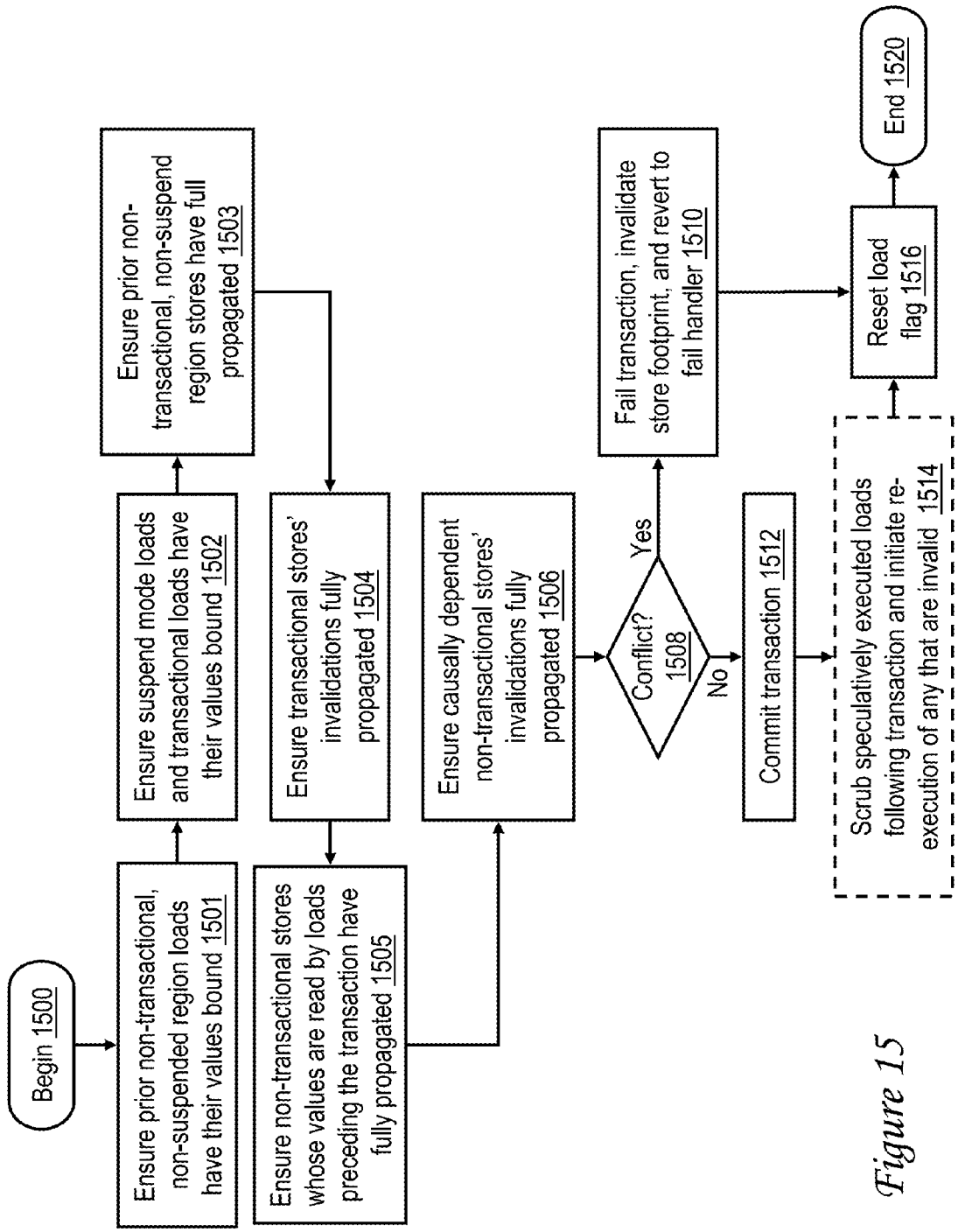
FIG. 15 is a high level logical flowchart of an exemplary method by which a multiprocessor data processing system processes an instruction terminating a memory transaction in an embodiment in which implicit barriers are enforced as if they occurred immediately prior to and following the memory transaction.

Referring now to FIG. 15, there is depicted a high level logical flowchart of an exemplary method by which a multiprocessor data processing system processes an instruction terminating a memory transaction in an embodiment in which implicit barriers are enforced as if they occurred immediately prior to and following the memory transaction. The process begins at block 1500, for example, in response to execution of a tend instruction within the LSU 206a of a processor core 200. The process of FIG. 15 proceeds from block 1500 to block 1501, which illustrates LSU 206a partially enforcing the barrier implicit in the tbegin instruction initiating the memory transaction by ensuring that all non-transactional load instructions that precede the memory transaction in program order (and are therefore not in a suspended region) have bound their data values. At block 1502, LSU 206a additionally ensures that all prior suspend mode load instructions and all prior transactional load instructions have their values bound. This check ensures the transactional load instructions are present in the memory transaction's footprint and that the suspend mode load instructions have obtained their values. The process proceeds from block 1502 to block 1503, which illustrates partially enforcing the barrier implicit in the tbegin instruction initiating the memory transaction by ensuring that all non-transactional store instructions that precede the memory transaction in program order (and are therefore not in a suspended region) have propagated their store data values to other processor cores.

The process passes from block 1503 to block 1504, which depicts ensuring that the cache line invalidations necessitated by transactional stores within the memory transaction have been fully propagated throughout the distributed shared memory system. In the embodiment described above, verification of propagation of the cache line invalidations necessitated by transactional stores is accomplished by one or more snoop machines 311 providing a retry response to any applicable TEND request on local interconnect 114 until the previous transactional stores have invalidated all cached copies of the memory location(s) targeted by the memory updates. At block 1505, LSU 206a completes enforcing the barrier implicit in the tbegin instruction initiating the memory transaction by ensuring that non-transactional stores whose store data values have been read by non-transactional load instructions preceding the memory transaction in program order have been fully propagated to other processor cores. The process then proceeds to block 1506, which illustrates ensuring that the cache line invalidations necessitated by causally dependent non-transactional stores have completely propagated throughout the distributed shared memory system. In the embodiment described above, verification of propagation of the cache line invalidations necessitated by non-transactional stores is accomplished by one or more instances of causality resolution logic 379 providing a retry response to any applicable TEND request on local interconnect 114 until the previous memory updates of causally dependent non-transactional stores have invalidated all cached copies of the memory location(s) targeted by the memory updates.

At block 1508, transactional control logic 382 determines whether or not a conflict has occurred for the memory transaction. In response to transactional control logic 382 determining that a conflict has occurred, the process proceeds to block 1510, which depicts transactional control logic 382 invalidating the tentative store footprint of the memory transaction (e.g., as recorded in L2 cache 214) and indicating via pass/fail indication 384 that the memory transaction has failed. As further illustrated at block 1510, in response to pass/fail indication 384 processor core 200 updates its condition code register and transfers control to the fail handling branch instruction within the memory transaction. The process proceeds from block 1510 to block 1516, which illustrates ISU 202 resetting LF 204. As noted above with reference to block 1504, in embodiments that do not support speculative execution of non-transactional load following the memory transaction in program order prior to commitment of the memory transaction, resetting LF 204 enables any such non-transactional loads to be dispatched by ISU 202. In alternative embodiments permitting speculative execution of such non-transactional load instructions prior to commitment of the memory transaction, resetting LF 204 enables ISU 202 to halt tracking by LRQ 210 of such non-transactional load instructions for invalidation. These effects of resetting of LF 204 occur because the barrier implicit in tend instructions is only enforced if the memory transaction succeeds. The process thereafter terminates at block 1520.

Returning to block 1508, in response to transactional control logic 382 determining that no conflict has occurred during execution of the memory transaction, the process proceeds to block 1512, which depicts TM control logic 382 committing the transaction, inter alia, by causing the transaction footprint to be committed to the distributed shared memory system (e.g., by updating one or more coherence states in the directory 308 of L2 cache 214 to indicate the transaction footprint is valid and available for access by all threads) and indicating to processor core 200 via pass/fail indication 384 that the memory transaction passed. In embodiments supporting speculative execution of non-transactional load instructions following the memory transaction in program order prior to commitment of the memory transaction, ISU 202 responds to the pass indication by enforcing the barrier implicit in the tend instruction by scrubbing any such speculatively executed load instructions for changes to their bound data values (block 1514). ISU 202 causes the data values of any such speculatively executed load instructions to be discarded and the load instructions to be re-executed non-speculatively. ISU 202 then resets LF 1516, which, in embodiments that do not support speculative execution of non-transactional load instructions following the memory transaction in program order prior to the commitment of the memory transaction, enables ISU 202 to dispatch any such non-transactional load instructions for execution by LSU 206*a* (block 1516). The process of FIG. 15 then terminates at block 1520.

Figures 16A, 16B:
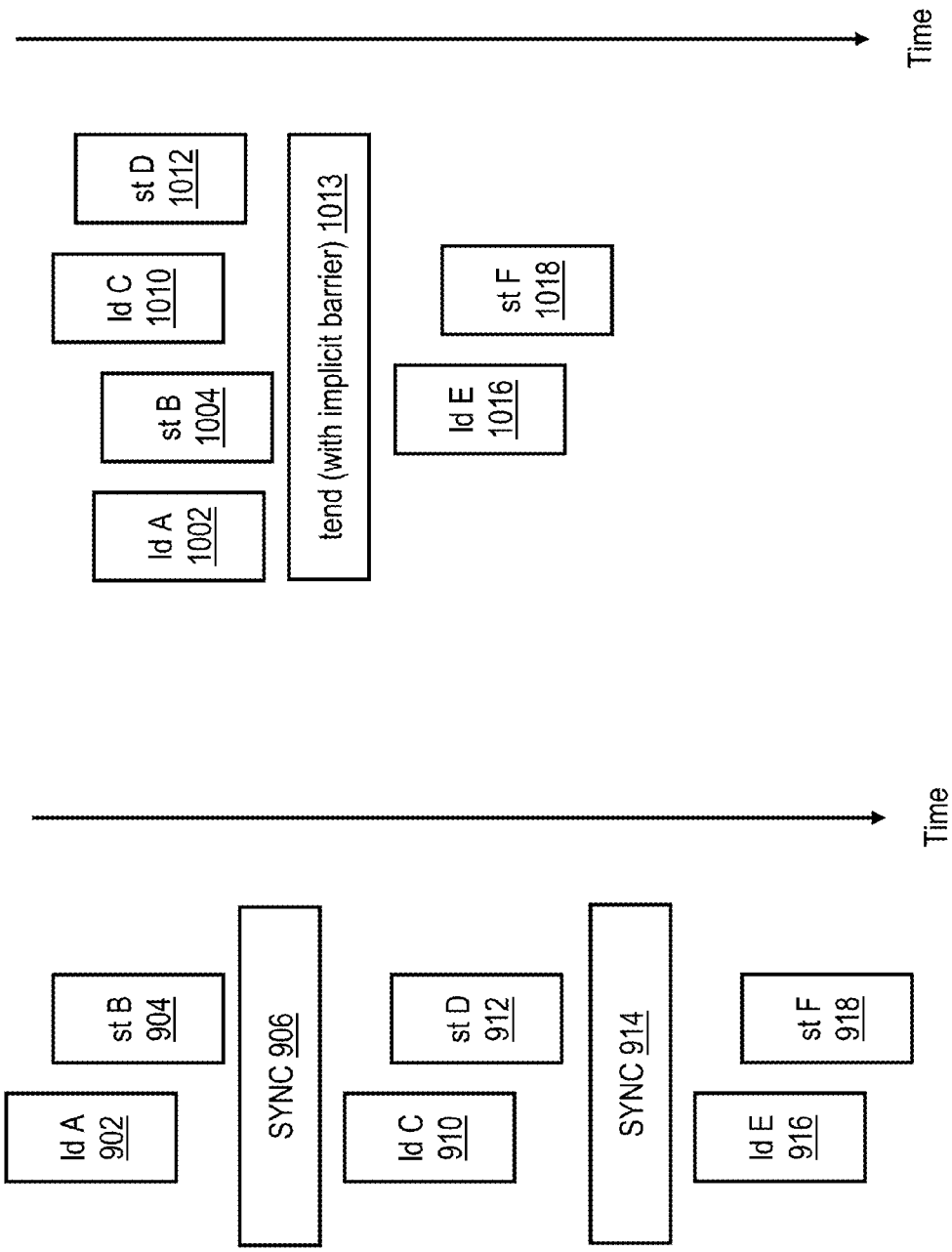
FIGS. 16A-16B are timing diagrams of the execution of memory transactions having explicit and implicit barriers, respectively.

With reference now to FIGS. 16A-16B, timing diagrams of the execution of memory transactions having explicit and implicit barriers are illustrated. In particular, FIG. 16A illustrates execution of a conventional memory transaction having explicit enclosing barrier instructions, as shown in FIG. 9. FIG. 16B, on the other hand, illustrates execution of a memory transaction in which the tbegin and tend instructions have implicit barrier semantics as described with reference to FIG. 10. In both examples, it is assumed that non-transactional load instructions cannot be executed speculatively in advance of a preceding barrier instruction or in advance of commitment of a preceding memory transaction.

In the prior art implementation shown in FIG. 16A, SYNC instruction 906 strictly orders the execution of non-transactional load and store instructions 902-904 that precede memory transaction 906 relative to transactional load and store instructions 910-912 within memory transaction 906, such that transactional load and store instructions 910-912 cannot begin execution until non-transactional load and store instructions 902-904 have completed. Similarly, SYNC instruction 914 strictly orders non-transactional load and store instructions 916 and 918 that follow memory transaction 906 in program order relative to transactional load and store instruction 910-912, such that non-transactional load and store instructions 916-918 cannot begin execution until transactional load and store instructions 910-912 have completed and memory transaction 906 has successfully committed to the shared distributed memory system.

In contrast to FIG. 16A, FIG. 16B illustrates that transactional memory access instructions within memory transaction 1006 (i.e., ld C 1010 and st D 1012) can be executed in any order with respect to non-transactional memory access instructions preceding memory transaction 1006 (i.e., ld A 1002 and st B 1004) (assuming intra-thread data dependencies are observed), with the barrier effects of tbegin instruction 1009 being implemented at the execution of tend instruction 1013 as described above. In this example, tend instruction 1013 also enforces an implicit barrier between memory access instructions preceding and within memory transaction 1006 (i.e., instructions 1002, 1004, 1010, and 1012) and non-transactional memory access instructions following memory transaction 1006 (i.e., ld E 1016 and st F 1018). By imbuing the instructions initiating and terminating a memory transaction with barrier semantics in this manner, performance can be improved by overlapping execution of memory access instructions 1002, 1004, 1010 and 1012 as shown, while advantageously leveraging the existing resources (i.e., transactional memory tracking logic) supporting execution of memory transactions.

Figure 17:
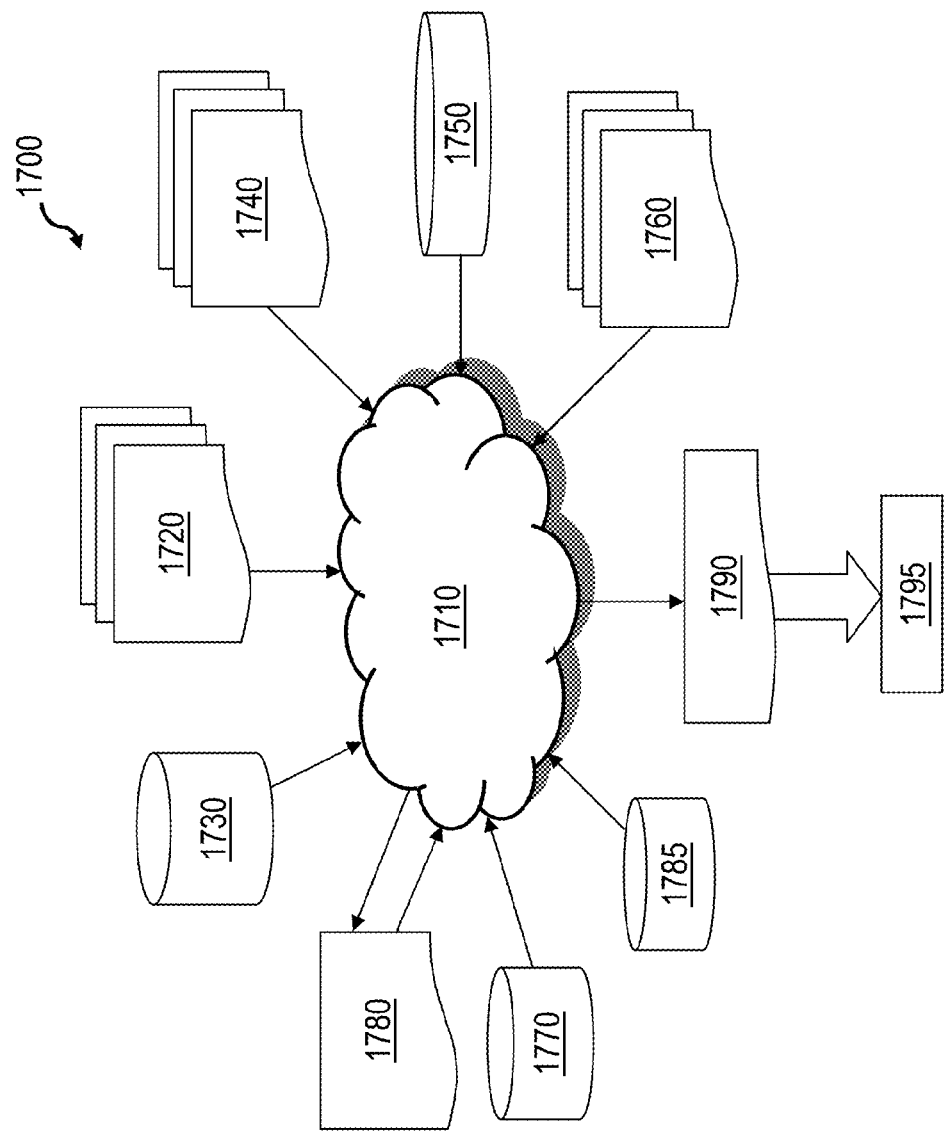
FIG. 17 is a data flow diagram illustrating a design process.

Referring now to FIG. 17, there is depicted a block diagram of an exemplary design flow 1700 used for example, in semiconductor IC logic design, simulation, test, layout, and manufacture. Design flow 1700 includes processes, machines and/or mechanisms for processing design structures or devices to generate logically or otherwise functionally equivalent representations of the design structures and/or devices described above and shown herein. The design structures processed and/or generated by design flow 1700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1700 may vary depending on the type of representation being designed. For example, a design flow 1700 for building an application specific IC (ASIC) may differ from a design flow 1700 for designing a standard component or from a design flow 1700 for instantiating the design into a programmable array, for example a programmable gate array (PGA) or a field programmable gate array (FPGA) offered by Altera® Inc. or Xilinx® Inc.

FIG. 17 illustrates multiple such design structures including an input design structure 1020 that is preferably processed by a design process 1710. Design structure 1720 may be a logical simulation design structure generated and processed by design process 1710 to produce a logically equivalent functional representation of a hardware device. Design structure 1720 may also or alternatively comprise data and/or program instructions that when processed by design process 1710, generate a functional representation of the physical structure of a hardware device. Whether representing functional and/or structural design features, design structure 1720 may be generated using electronic computer-aided design (ECAD) such as implemented by a core developer/designer. When encoded on a machine-readable data transmission, gate array, or storage medium, design structure 1720 may be accessed and processed by one or more hardware and/or software modules within design process 1710 to simulate or otherwise functionally represent an electronic component, circuit, electronic or logic module, apparatus, device, or system such as those shown herein. As such, design structure 1720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1710 preferably employs and incorporates hardware and/or software modules for synthesizing, translating, or otherwise processing a design/simulation functional equivalent of the components, circuits, devices, or logic structures shown herein to generate a netlist 1780 which may contain design structures such as design structure 1720. Netlist 1780 may comprise, for example, compiled or otherwise processed data structures representing a list of wires, discrete components, logic gates, control circuits, I/O devices, models, etc. that describes the connections to other elements and circuits in an integrated circuit design. Netlist 1780 may be synthesized using an iterative process in which netlist 1780 is resynthesized one or more times depending on design specifications and parameters for the device. As with other design structure types described herein, netlist 1780 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1710 may include hardware and software modules for processing a variety of input data structure types including netlist 1780. Such data structure types may reside, for example, within library elements 1730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1740, characterization data 1750, verification data 1760, design rules 1770, and test data files 1785 which may include input test patterns, output test results, and other testing information. Design process 1710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1710 without deviating from the scope and spirit of the invention. Design process 1710 may also include modules for performing standard circuit design processes such as timing analysis, verification, design rule checking, place and route operations, etc.

Design process 1710 employs and incorporates logic and physical design tools such as HDL compilers and simulation model build tools to process design structure 1720 together with some or all of the depicted supporting data structures along with any additional mechanical design or data (if applicable), to generate a second design structure 1790. Design structure 1790 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1720, design structure 1790 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1790 may comprise a compiled, executable HDL simulation model that functionally simulates the devices shown herein.

Design structure 1790 may also employ a data format used for the exchange of layout data of integrated circuits and/or symbolic data format (e.g., information stored in a GDSII (GDS2), GL1, OASIS, map files, or any other suitable format for storing such design data structures). Design structure 1790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1790 may then proceed to a stage 1795 where, for example, design structure 1790: proceeds to tape-out, is released to manufacturing, is released to a mask house, is sent to another design house, is sent back to the customer, etc.

As has been described, in at least one embodiment, a processor core executes a code segment including a memory transaction and a non-transactional memory access instructions preceding the memory transaction in program order. The memory transaction includes at least an initiating instruction, a transactional memory access instruction, and a terminating instruction. The initiating instruction has an implicit barrier that imparts the effect of ordering execution of the transactional memory access instruction within the memory transaction with respect to the non-transactional memory access instructions preceding the memory transaction in program order. Executing the code segment includes executing the transactional memory access instruction within the memory transaction concurrently with at least one of the non-transactional memory access instructions preceding the memory transaction in program order and enforcing the barrier implicit in the initiating instruction following execution of the initiating instruction.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like, but excludes signal media.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit, comprising:
a processor core including:
an instruction sequencing unit that orders instructions for execution; and
one or more execution units that execute a code segment including a memory transaction and a non-transactional memory access instructions preceding the memory transaction in program order, wherein:
the memory transaction includes at least an initiating instruction, a transactional memory access instruction, and a terminating instruction;
the initiating instruction has an implicit barrier that imparts the effect of ordering execution of the transactional memory access instruction within the memory transaction with respect to the non-transactional memory access instructions preceding the memory transaction in program order; and
transactional memory tracking logic, coupled to the processor core, that tracks a transaction footprint of the memory transaction for conflicts;
wherein the processor core executes the transactional memory access instruction within the memory transaction concurrently with at least one of the non-transactional memory access instructions preceding the memory transaction in program order and enforces the barrier implicit in the initiating instruction following execution of the initiating instruction only if the memory transaction commits successfully to a shared memory system coupled to the processing unit.

2. The processing unit of claim 1, wherein:
the memory transaction encloses a suspended region including at least one non-transactional memory access instruction; and
the processor core enforces the barrier implicit in the initiating instruction responsive to initiation of execution of the suspended region and prior to execution of the at least one non-transactional memory access instruction within the suspended region.

3. The processing unit of claim 2, wherein:
the instruction sequencing unit enforces the barrier implicit in the initiating instruction by dynamically injecting a barrier instruction into the code sequence prior to execution of the at least one non-transactional memory access instruction within the suspended region.

4. The processing unit of claim 1, wherein the processor core enforces the barrier implicit in the initiating instruction at execution of the terminating instruction.

5. The processing unit of claim 1, wherein:
the code segment further includes a non-transactional load instruction following the memory transaction in program order, wherein the non-transactional load instruction has a target memory location from which a data value is to be loaded;
the terminating instruction has an implicit barrier that orders execution of the transactional memory access instruction within the memory transaction with respect to the non-transactional load instructions preceding the memory transaction in program order; and
the processor core enforces the barrier implicit in the terminating instruction at execution of the terminating instruction.

6. The processing unit of claim 5, wherein:
the processor core speculatively executes the non-transactional load instruction prior to executing the terminating instruction of the memory transaction;
the transactional memory tracking logic tracks the target memory location for an update prior to execution of the terminating instruction; and
the processor core enforces the barrier implicit in the terminating instruction by determining if an update to the target memory location has been made following speculative execution of the non-transactional load instruction and, in response to determining an update to the target memory location has been made following speculative execution of the non-transactional load instruction, discarding a data value bound by speculative execution of the non-transactional load instruction.

7. A data processing system, comprising:
a plurality of processing units in accordance with claim 1; and
an interconnect fabric coupling the plurality of processing units.

8. A design structure tangibly embodied in a machine-readable storage device for designing, manufacturing, or testing an integrated circuit, the design structure comprising:
a processing unit, including:
a processor core including:
an instruction sequencing unit that orders instructions for execution; and
one or more execution units that execute a code segment including a memory transaction and a non-transactional memory access instructions preceding the memory transaction in program order, wherein:
the memory transaction includes at least an initiating instruction, a transactional memory access instruction, and a terminating instruction;
the initiating instruction has an implicit barrier that imparts the effect of ordering execution of the transactional memory access instruction within the memory transaction with respect to the non-transactional memory access instructions preceding the memory transaction in program order; and
transactional memory tracking logic, coupled to the processor core, that tracks a transaction footprint of the memory transaction for conflicts;
wherein the processor core executes the transactional memory access instruction within the memory transaction concurrently with at least one of the non-transactional memory access instructions preceding the memory transaction in program order and enforces the barrier implicit in the initiating instruction following execution of the initiating instruction only if the memory transaction commits successfully to a shared memory system coupled to the processing unit.

9. The design structure of claim 8, wherein:

the memory transaction encloses a suspended region including at least one non-transactional memory access instruction; and the processor core enforces the barrier implicit in the initiating instruction responsive to initiation of execution of the suspended region and prior to execution of the at least one non-transactional memory access instruction within the suspended region.

10. The design structure of claim 9, wherein:

the instruction sequencing unit enforces the barrier implicit in the initiating instruction by dynamically injecting a barrier instruction into the code sequence prior to execution of the at least one non-transactional memory access instruction within the suspended region.

11. The design structure of claim 8, wherein the processor core enforces the barrier implicit in the initiating instruction at execution of the terminating instruction.

12. The design structure of claim 8, wherein:

the code segment further includes a non-transactional load instruction following the memory transaction in program order, wherein the non-transactional load instruction has a target memory location from which a data value is to be loaded;

the terminating instruction has an implicit barrier that orders execution of the transactional memory access instruction within the memory transaction with respect to the non-transactional load instructions preceding the memory transaction in program order; and the processor core enforces the barrier implicit in the terminating instruction at execution of the terminating instruction.

* * * * *